(12) United States Patent  
Kakuta et al.

(10) Patent No.: US 8,676,880 B2  
(45) Date of Patent: Mar. 18, 2014

(54) SERVER APPARATUS, COMMUNICATION APPARATUS, AND METHOD FOR GENERATING NAVIGATION INFORMATION

(75) Inventors: Jun Kakuta, Kawasaki (JP); Ryuichi Matsukura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 268 days.

(21) Appl. No.: 12/869,738

(22) Filed: Aug. 26, 2010

(65) Prior Publication Data

US 2011/0055357 A1 Mar. 3, 2011

(30) Foreign Application Priority Data

Aug. 27, 2009 (JP) .................................. 2009-197313

(51) Int. Cl.  
*G06F 15/16* (2006.01)
(52) U.S. Cl.  
USPC .......................................... 709/202; 709/203
(58) Field of Classification Search  
USPC .................................. 709/202, 203  
See application file for complete search history.

(56) References Cited

U.S. PATENT DOCUMENTS 6,931,428 B2 * 8/2005 Peddu et al. .................. 709/203

FOREIGN PATENT DOCUMENTS

| JP | 2002-334115 A | 11/2002 |
| JP | 2003-330856 A | 11/2003 |

* cited by examiner

*Primary Examiner* — Adnan Mirza  
(74) *Attorney, Agent, or Firm* — Fujitsu Patent Center

(57) ABSTRACT

A server apparatus includes, a transceiver unit to transmit to a communication apparatus a web page having link information to each of a plurality of contents, to transmit to the communication apparatus a content requested by the communication apparatus among the plurality of contents, and to transmit to the communication apparatus navigation information that includes link information to any of the plurality of contents; a storage unit to store identification information for identifying each of the plurality of contents and reference information indicating whether each content corresponding to the identification information is transmitted to the communication apparatus; and a generation unit to generate, on the basis of the reference information, the navigation information which does not include the link information corresponding to the content requested by the communication apparatus from among the plurality of contents.

20 Claims, 37 Drawing Sheets

FIG. 5

| PAGE URL | ARTICLE BLOCK | ARTICLE NAME | LINK DESTINATION URL | REFERRED STATUS |
|---|---|---|---|---|
| www.example.com/index.html | LATEST NEWS | ARTICLE A | www.example.com/article_a.html | |
| | | ARTICLE B | www.example.com/article_b.html | |
| | | ARTICLE C | www.example.com/article_c.html | |
| | | ARTICLE D | www.example.com/article_d.html | |
| | PRIME NEWS | ARTICLE 1 | www.example.com/article_1.html | |
| | | ARTICLE 2 | www.example.com/article_2.html | |

FIG. 6

```
<navi-list>
  <navi name= "LATEST NEWS">
    <item name= "ARTICLE A" url="http://www.example.com./article_a.html" />
    <item name= "ARTICLE B" url="http://www.example.com./article_b.html" />
    <item name= "ARTICLE C" url="http://www.example.com./article_c.html" />
    <item name= "ARTICLE D" url="http://www.example.com./article_d.html" />
  </navi>
  <navi name= "PRIME NEWS">
    <item name= "ARTICLE 1" url="http://www.example.com./article_1.html" />
    <item name= "ARTICLE 2" url="http://www.example.com./article_2.html" />
  </navi>
</navi-list>
```

FIG. 7

```
<html>
    <head><title>NEWS SITE</title></head>
    <dody>
        </navi-lists>
            <navi name= "LATEST NEWS">
                <item name= "ARTICLE A" url="http://www.example.com./article_a.html" />
                <item name= "ARTICLE B" url="http://www.example.com./article_b.html" />
                <item name= "ARTICLE C" url="http://www.example.com./article_c.html" />
                <item name= "ARTICLE D" url="http://www.example.com./article_d.html" />
            </navi>
            <navi name= "PRIME NEWS">
                <item name= "ARTICLE 1" url="http://www.example.com./article_1.html" />
                <item name= "ARTICLE 2" url="http://www.example.com./article_2.html" />
            </navi>
        </navi-lists>
        <div>
            <div>
                <h2><a href= "/latest/index.html">LATEST NEWS </a></h2>
                <div>
                    <h3><a hres= "/news/article_a.index>ARTICLE A</a></h3>
                    <div>CONTENT OF ARTICLE A<div>
                </div>
                <div>
                    <h3><a hres= "/news/article_b.index>ARTICLE B</a></h3>
                    <div>CONTENT OF ARTICLE B<div>
                </div>
            </div>
                                    . . .
            <div>    <h2><a href= "/prime/index.html">PRIME NEWS</a></h2>
                <div>
                    <h3><a hres= "/news/article_1.index>ARTICLE 1 </a></h3>
                    <div>CONTENT OF ARTICLE I<div>
                </div>
                                    . . .
            </div>
        </div>
    </dody>
</html>
```

FIG. 9

| PAGE URL | ARTICLE BLOCK | ARTICLE NAME | LINK DESTINATION URL | REFERRED STATUS |
|---|---|---|---|---|
| www.example.com/index.html | LATEST NEWS | ARTICLE A | www.example.com/article_a.html | YES |
| | | ARTICLE B | www.example.com/article_b.html | |
| | | ARTICLE C | www.example.com/article_c.html | |
| | | ARTICLE D | www.example.com/article_d.html | |
| | PRIME NEWS | ARTICLE 1 | www.example.com/article_1.html | |
| | | ARTICLE 2 | www.example.com/article_2.html | |

FIG. 10

| PAGE URL | ARTICLE BLOCK | ARTICLE NAME | LINK DESTINATION URL | REFERRED STATUS |
|---|---|---|---|---|
| www.example.com/index.html | LATEST NEWS | ARTICLE A | www.example.com/article_a.html | YES |
| | | ARTICLE B | www.example.com/article_b.html | |
| | | ARTICLE C | www.example.com/article_c.html | |
| | | ARTICLE D | www.example.com/article_d.html | |
| | PRIME NEWS | ARTICLE 1 | www.example.com/article_1.html | |
| | | ARTICLE 2 | www.example.com/article_2.html | |
| www.example.com/index_a.html | — | ASSOCIATED INFORMATION | www.example.com/20090514/article_12.html | |
| | | PRESS RELEASE | www.company-x.com/release.html | |
| | | HOME PAGE OF COMPANY X | www.company-x.com | |

FIG. 16

| PAGE URL | ARTICLE BLOCK | ARTICLE NAME | LINK DESTINATION URL | REFERRED STATUS | PREVIOUSLY SELECTED |
|---|---|---|---|---|---|
| www.example.com./index.html | LATEST NEWS | ARTICLE A | www.example.com./article_a.html | YES | YES |
| | | ARTICLE B | www.example.com./article_b.html | | |
| | | ARTICLE C | www.example.com./article_c.html | | |
| | | ARTICLE D | www.example.com./article_d.html | | |
| | PRIME NEWS | ARTICLE 1 | www.example.com./article_1.html | | |
| | | ARTICLE 2 | www.example.com./article_2.html | | |

FIG. 17

| PAGE URL | ARTICLE BLOCK | ARTICLE NAME | LINK DESTINATION URL | REFERRED STATUS | PREVIOUSLY SELECTED |
|---|---|---|---|---|---|
| www.example.com/index.html | LATEST NEWS | ARTICLE A | www.example.com/article_a.html | YES | |
| | | ARTICLE B | www.example.com/article_b.html | YES | |
| | | ARTICLE C | www.example.com/article_c.html | YES | |
| | | ARTICLE D | www.example.com/article_d.html | YES | |
| | PRIME NEWS | ARTICLE 1 | www.example.com/article_1.html | | YES |
| | | ARTICLE 2 | www.example.com/article_2.html | | |

FIG. 18

| PAGE URL | ARTICLE BLOCK | ARTICLE NAME | LINK DESTINATION URL | REFERRED STATUS | PREVIOUSLY SELECTED |
|---|---|---|---|---|---|
| www.example.com/index.html | LATEST NEWS | ARTICLE A | www.example.com/article_a.html | YES | |
| | | ARTICLE B | www.example.com/article_b.html | YES | |
| | | ARTICLE C | www.example.com/article_c.html | YES | |
| | | ARTICLE D | www.example.com/article_d.html | YES | |
| | PRIME NEWS | ARTICLE 1 | www.example.com/article_1.html | YES | |
| | | ARTICLE 2 | www.example.com/article_2.html | YES | |
| www.other-example.com/index.html | RELEASE | NEW PRODUCT | www.other-example.com/rel.html | | |

FIG. 19

| PAGE URL | ARTICLE BLOCK | ARTICLE NAME | LINK DESTINATION URL | REFERRED STATUS | PREVIOUSLY SELECTED |
|---|---|---|---|---|---|
| www.example.com./index.html | LATEST NEWS | ARTICLE A | www.example.com/article_a.html | YES | |
| | | ARTICLE B | www.example.com/article_b.html | Pending | |
| | | ARTICLE C | www.example.com/article_c.html | Pending | |
| | | ARTICLE D | www.example.com/article_d.html | Pending | |
| | PRIME NEWS | ARTICLE 1 | www.example.com/article_1.html | Pending | |
| | | ARTICLE 2 | www.example.com/article_2.html | Pending | |
| www.other-example.com./index.html | RELEASE | NEW PRODUCT | www.other-example.com/rel.html | | |

FIG. 20

```
<navi-list>
  <navi name= "LATEST NEWS">
    <item name= "ARTICLE B" status="pending" url="http://www.example.com./article_b.html" />
    <item name= "ARTICLE C" status="pending" url="http://www.example.com./article_c.html" />
    <item name= "ARTICLE D" status="pending" url="http://www.example.com./article_d.html" />
  </navi>
  <navi name= "PRIME NEWS">
    <item name= "ARTICLE 1" status="pending" url="http://www.example.com./article_1.html" />
    <item name= "ARTICLE 2" status="pending" url="http://www.example.com./article_2.html" />
  </navi>
</navi-list>
```

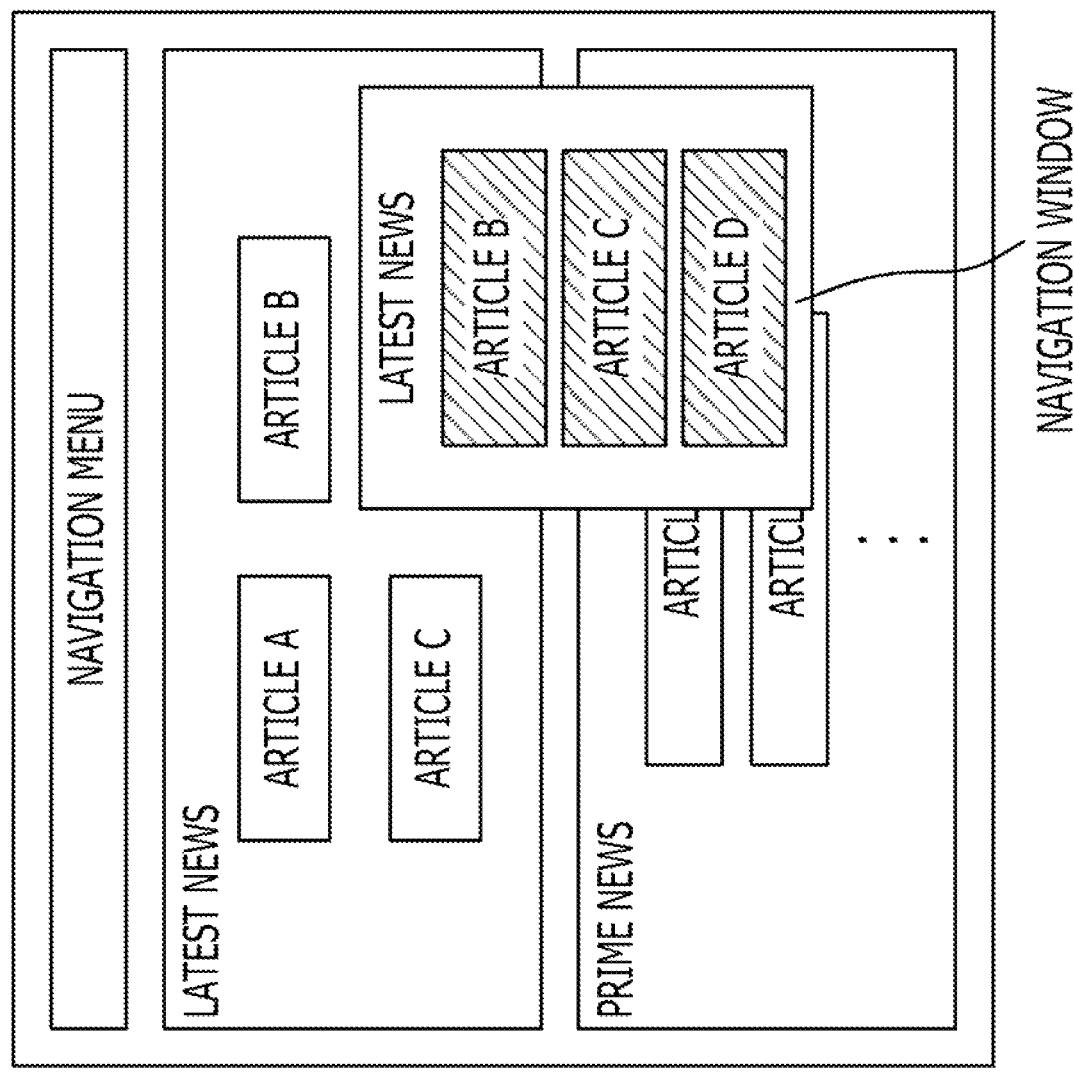

FIG. 22

| PAGE URL | ARTICLE BLOCK | ARTICLE NAME | LINK DESTINATION URL | REFERRED STATUS |
|---|---|---|---|---|
| www.example.com/index.html | LATEST NEWS | ARTICLE A | www.example.com/article_a.html | |
| | | ARTICLE B | www.example.com/article_b.html | |
| | | ARTICLE C | www.example.com/article_c.html | |
| | | ARTICLE D | www.example.com/article_d.html | |
| | PRIME NEWS | ARTICLE 1 | www.example.com/article_1.html | |
| | | ARTICLE 2 | www.example.com/article_2.html | |
| | — | MEDIA | www.example.com/article_a.html | |
| www.company-x.com/index.html | | PRESS RELEASE | www.company-x.com/release/20090515.html | |

FIG. 23

| PAGE URL | ARTICLE BLOCK | ARTICLE NAME | LINK DESTINATION URL | REFERRED STATUS |
|---|---|---|---|---|
| www.example.com./index.html | LATEST NEWS | ARTICLE A | www.example.com/article_a.html | YES |
| | | ARTICLE B | www.example.com/article_b.html | |
| | | ARTICLE C | www.example.com/article_c.html | |
| | | ARTICLE D | www.example.com/article_d.html | |
| | PRIME NEWS | ARTICLE 1 | www.example.com/article_1.html | |
| | | ARTICLE 2 | www.example.com/article_2.html | |
| www.company-x.com./index.html | — | MEDIA | www.example.com/article_a.html | YES |
| | | PRESS RELEASE | www.company-x.com./release/20090515.html | |

FIG. 24

| PAGE URL | ARTICLE BLOCK | ARTICLE NAME | LINK DESTINATION URL | REFERRED STATUS |
|---|---|---|---|---|
| www.example.com/index.html | LATEST NEWS | COMPANY X RELEASES NEW PRODUCT YYY! | www.example.com/article_a.html | |
| | | ARTICLE B | www.example.com/article_b.html | |
| | | ARTICLE C | www.example.com/article_c.html | |
| | | ARTICLE D | www.example.com/article_d.html | |
| | PRIME NEWS | ARTICLE 1 | www.example.com/article_1.html | |
| | | ARTICLE 2 | www.example.com/article_2.html | |
| | | MEDIA | www.example.com/article_a.html | |
| www.company-x.com/index.html | — | NEW PRODUCT YYY ON SALE | www.company-x.com/release/20090515.html | |

FIG. 25

| PAGE URL | ARTICLE BLOCK | ARTICLE NAME | LINK DESTINATION URL | REFERRED STATUS |
|---|---|---|---|---|
| www.example.com/index.html | LATEST NEWS | COMPANY X RELEASES NEW PRODUCT YYY! | www.example.com/article_a.html | YES |
| | | ARTICLE B | www.example.com/article_b.html | |
| | | ARTICLE C | www.example.com/article_c.html | |
| | | ARTICLE D | www.example.com/article_d.html | |
| | PRIME NEWS | ARTICLE 1 | www.example.com/article_1.html | |
| | | ARTICLE 2 | www.example.com/article_2.html | |
| | — | MEDIA | www.example.com/article_a.html | YES |
| www.company-x.com/index.html | | NEW PRODUCT YYY ON SALE | www.company-x.com/release/20090515.html | YES |

FIG. 36

```
<navi-list>
  <navi name= "LATEST NEWS">
    <item name= "ARTICLE B" status= "pending" url= "http://www.example.com/article_b.html" />
    COMPANY A ANNOUNCES THAT MORE ROBUST SECURITY TECHNOLOGY THAN EVER IS DEVELOPED.
    </item>
    <item name= "ARTICLE C" url= "http://www.example.com/article_c.html" />
    COMPANY B COMPLETELY CHANGES LINE UP FOR DESKTOP PCS AND LAPTOP PCS.
    </item>
  </navi>
  <navi name= "PRIME NEWS">
    <item name= "ARTICLE 1" status= "pending" url= "http://www.example.com/article_1.html" />
    COMPANY C ANNOUNCES THAT SNS SERVICE IS SOLD TO COMPANY D.
    </item>
  </navi>
</navi-list>
```

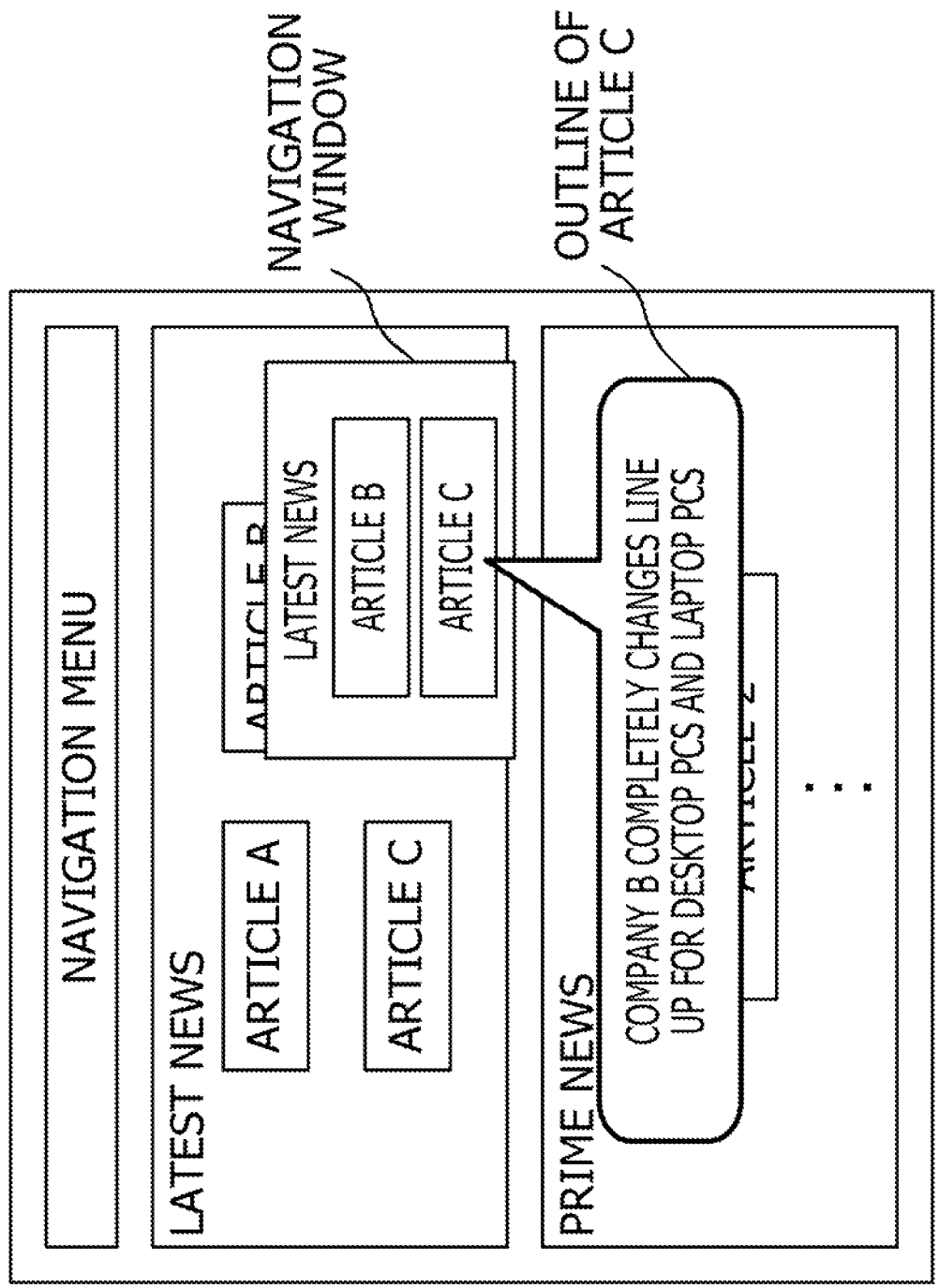

US 8,676,880 B2

SERVER APPARATUS, COMMUNICATION APPARATUS, AND METHOD FOR GENERATING NAVIGATION INFORMATION

CROSS-REFERENCE TO RELATED APPLICATIONS

This application is based upon and claims the benefit of priority of the prior Japanese Patent Application No. 2009-197313, filed on Aug. 27, 2009, the entire content of which are incorporated herein by reference.

FIELD

The present embodiments relate to a server apparatus, a communication apparatus, and a navigation information generation method for improving an efficiency of web page browsing.

BACKGROUND

In recent years, mobile terminals equipped with a full browser which may show a web site designed for a PC has been increased. Along with a spread of a flat-rate for a mobile communication, occasions for viewing the web site designed for the PC is increased. It should be however noted that a current mobile terminal has a small screen size, and it is hard to mention that a high operability for a move between web pages is realized.

For example, unless the screen is expanded and displayed, it is difficult for a user to press a navigation bar used for the navigation between the web pages. Similarly, a click operation for selecting a link in a web page is also difficult to perform.

In addition, in a case where the screen is expanded and displayed for the press of the navigation bar or the link click, a content display area is reduced in size. Therefore, the user needs to perform the reduced display after the web page navigation, and the operation is troublesome. It should be noted that the navigation bar is often arranged on an upper part or a left part of a web page in a general web site.

Technologies are proposed for improving the operability for the web page navigation at a time of viewing the web site in the mobile terminal with the small screen. For example, Japanese Unexamined Patent Application Publication No. 2002-334115 illustrates that navigation data in which content data and content link information are described is placed on a server. Furthermore, Japanese Unexamined Patent Application Publication No. 2002-334115 discloses that a client web browser receives those pieces of data, displays only the content at normal cases, and overlaps and displays the navigation data on the content in a case where an instruction is issued from the user.

SUMMARY

According to an aspect of the invention, a server apparatus includes, a transceiver unit to transmit to a communication apparatus a web page having link information to each of a plurality of contents, to transmit to the communication apparatus a content requested by the communication apparatus among the plurality of contents, and to transmit to the communication apparatus navigation information that includes link information to any of the plurality of contents; a storage unit to store identification information for identifying each of the plurality of contents and reference information indicating whether each content corresponding to the identification information is transmitted to the communication apparatus while each content and the corresponding identification information are being associated with each other; and a generation unit to refer to the storage unit and to generate, on the basis of the reference information corresponding to each of the plurality of contents, the navigation information which does not include the link information corresponding to the content requested by the communication apparatus from among the plurality of contents.

The object and advantages of the invention will be realized and attained by at least the elements, features, and/or combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a conceptual diagram showing an example of a non-reference list;

FIG. 6 shows an example of navigation information;

FIG. 7 shows an example of the HTML document returned from the gateway server;

FIG. 9 shows an example in which a referred link is deleted from the non-reference list;

FIG. 10 shows a content of the non-reference list after a new page reference is performed;

FIG. 16 is a conceptual diagram showing an example of the non-reference list according to an embodiment;

FIG. 17 shows an example of the non-reference list updated at a timing of another block reference;

FIG. 18 shows an example of the non-reference list updated at a timing of another domain reference;

FIG. 19 shows an example of the non-reference list having a tentative deletion state;

FIG. 20 shows an example of the navigation information having the tentative deletion state;

FIG. 21 is a schematic diagram showing an example of the navigation window having the tentative deletion state;

FIG. 22 shows an example of the non-reference list including the same link destination URL;

FIG. 23 shows an example of the non-reference list including the same link destination URL;

FIG. 24 shows an example of the non-reference list including a similar article name;

FIG. 25 shows an example of the non-reference list including a similar article name;

FIG. 36 shows an example of navigation information including an article content; and FIG. 37 shows a navigation window example including the article content.

DESCRIPTION OF EMBODIMENTS

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present.

A reference may be made to a part of an article at a link destination included in a web page in some cases. For example, this reference may be a selection to view and/or access an article at a link destination. According to the technology disclosed in Japanese Unexamined Patent Application Publication No. 2002-334115, the part of the article at the link destination is included in the web page at the next access and is thus included in navigation data. Accordingly, each time, it may be necessary to select a non-reference article, to which a reference is not yet made, and an operation becomes troublesome for a user as the user has to remember which article already has been selected to avoid selecting such an article again. Also, in a case where the user interrupts the reference and the web page is updated during the interruption, a non-reference article may not be included in the navigation data at the next access. Thus, it is difficult for the user to access the non-reference article newly added through the update. For that reason, the technology as disclosed in Japanese Unexamined Patent Application Publication No. 2002-334115 may not be sufficiently user friendly and therefore may not garner popular usage.

As described herein, there is provided a server apparatus, a communication apparatus, and a navigation information generation method with which the high operability and usability for the user are realized.

Figure 1:
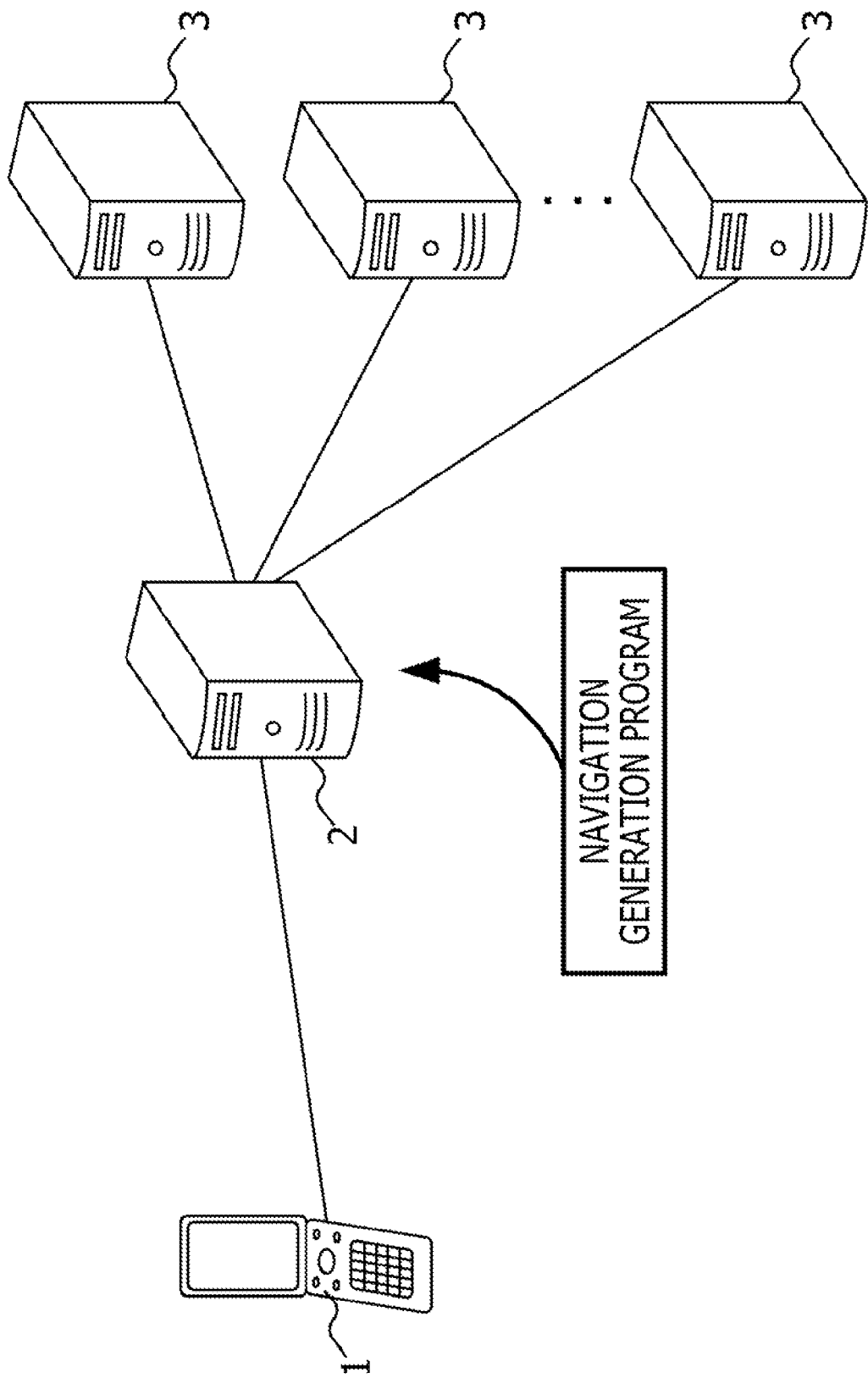
FIG. 1 is a configuration diagram showing a navigation system according to an embodiment of the present invention.

FIG. 1 is a configuration diagram showing a navigation system in one embodiment of the present invention. FIG. 1 shows a configuration in which a mobile phone device 1 passes through a gateway server 2 when information of a plurality of web servers 3 is accessed. The web server 3 may be a web server on the general internet or a web server existing in an enterprise. Also, the gateway server 2 may exist in a communication carrier which provides a mobile network communication or may exist in an enterprise. Also, a communication apparatus remotely accessing the web server 3 is exemplified as the mobile phone device 1 in FIG. 1, but in addition to this, a PDA (Personal Digital Assistant), a laptop PC, or a desktop PC may be used. Also, according to the present embodiment, a description is given while it is assumed that the communication apparatus is connected to a mobile network, but a configuration may also be adopted in which the communication apparatus is connected to the common internet.

It is assumed that a web browser for displaying a content and navigation information is operated on the mobile phone device 1. In other words, it is assumed that a navigation generation program for generating the navigation information is operated on the gateway server 2.

Figure 2:
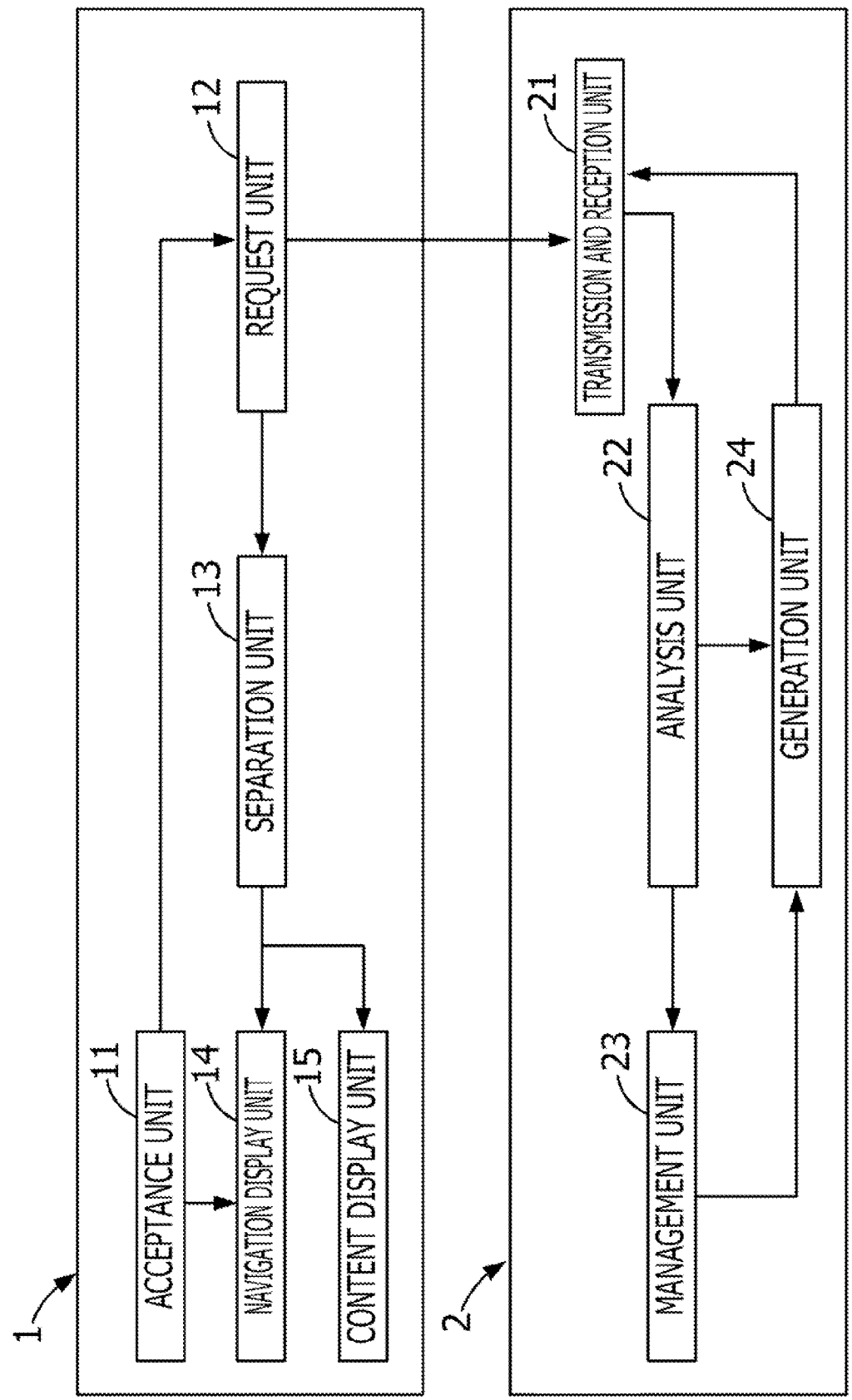
FIG. 2 is a function block diagram of a mobile phone device and a gateway server according to an embodiment.

FIG. 2 is a function block diagram of the mobile phone device 1 and the gateway server 2 according to an embodiment. The mobile phone device 1 performs a display control on a web page transmitted from the gateway server 2. The mobile phone device 1 includes an acceptance unit 11, a request unit 12, a separation unit 13, a navigation display unit 14, and a content display unit 15. The acceptance unit 11 accepts an input from the user. The request unit 12 issues a request related to accessing a web page. The separation unit 13 separates display data, such as HTML data (HTML: Hyper Text Markup Language), into a content and navigation information. The navigation display unit 14 displays the navigation information. The content display unit 15 displays the content.

The gateway server 2 generates navigation information for showing a non-reference content, to which a reference is not yet made, for guidance in the mobile phone device 1. It should be noted that the content is, for example, a news article. The gateway server 2 is provided with a transmission and reception (transceiver) unit 21, an analysis unit 22, a management unit 23, and a generation unit 24. The transmission and reception unit 21 requests an HTML file transmission to the web server 3 or receives an HTML file from the web server 3. The analysis unit 22 analyzes the HTML file to analyze a link structure included in the HTML file. Among web pages at link destinations included in respective web pages for each user, the management unit 23 stores non-reference link information in a non-reference list. The generation unit 24 generates navigation information from the link information which is not referred yet in the respective web pages.

In a case where an input related to the web page access request is accepted from the user, the acceptance unit 11 notifies the request unit 12 of the acceptance of the input. The request unit 12 requests the transmission and reception unit 21 to obtain web page information. The transmission and reception unit 21 extracts information on a reference origin page and a reference target page of the user from the requested content. Then, the transmission and reception unit 21 notifies the management unit 23 of the information on the reference origin page and the reference target page. The management unit 23 stores the notified information in the non-reference list. Furthermore, the transmission and reception unit 21 requests the web server 3 where the reference target page exists to obtain a file. The management unit 23 deletes the information related to the reference target page from non-reference list information in the reference origin page on the basis of the information on the reference origin page and the reference target page received from the transmission and reception unit 21.

Subsequently, the transmission and reception unit 21 receives the HTML file from the web server 3. Then, the analysis unit 22 analyzes the HTML file to extract the link destination information included in the HTML file. Furthermore, the analysis unit 22 notifies the management unit 23 of the link information. The management unit 23 updates the non-reference list of the web pages on the basis of the notified link information.

The analysis unit 22 sends the received HTML file to the generation unit 24. The generation unit 24 obtains a list of the non-reference pages from the management unit 23. Then, the generation unit 24 generates navigation information to be added to the HTML file. The generation unit 24 sends the HTML file that should be transmitted to the mobile phone device 1 to the transmission and reception unit 21. It should be noted that the HTML file that should be transmitted to the mobile phone device 1 includes the HTML file received by the management unit 23 from the web server 3 and the navigation information. Then, the transmission and reception unit 21 transmits the HTML file including the navigation information to the mobile phone device 1.

In a case where the request unit 12 of the mobile phone device 1 receives the HTML file including the navigation information serving as a response to the request, the HTML file is sent to the separation unit 13. Then, the separation unit 13 separates the HTML file into a navigation part and a content part. Then, the separation unit 13 sends the separated navigation part to the navigation display unit 14. Also, the separation unit 13 sends the separated content part to the content display unit 15. The content display unit 15 displays the received content. The navigation display unit 14 displays the navigation information on the content in accordance with an operation instruction from the user.

The gateway server may include a processor and memory (optical disk, memory chip, etc.) having software programs therein executed by the processor to effect operations performed by the various "units" (21-24) in the gateway server. Similarly, the mobile phone device may include a processor and memory to effect operations performed by various "units" (11-15) therein and possibly further including a LCD for the navigation display unit 14.

Hereinafter, an operation for generating the navigation information in the gateway server 2.

First, a case will be described in which an initial page of a news site is selected from a bookmark of a web browser of the mobile phone device 1. For example, it is assumed that a URL (Uniform Resource Locator) of the initial page is "http//www.example.com/index.html." The web browser requests the gateway server 2 to obtain information on the initial page of the news site by way of HTTP (Hyper Text Transfer Protocol). At this time, the web browser passes over a command and the URL of the initial page of the news site to the gateway server 2. The command is an "HTTP GET" command. The web browser receives the HTML file at the URL specified from the gateway server 2 as a response to the "HTTP GET" command. A reception processing for the HTML file will be described later.

Subsequently, an operation of the gateway server 2 which receives the "HTTP GET" command from the web browser will be described. In a case where the "HTTP GET" command is received, the gateway server 2 obtains a reference target URL and a value of a referrer header. According to this embodiment, the reference target URL is a URL (http://www.example.com/index.html) of the initial page of the news site which the web browser attempts to access. The referrer header is auxiliary information automatically set by the web browser at the time of a data communication based on HTTP. In a case where link information existing in a certain web page is clicked, a URL of the web page where the click is performed is set in the referrer header. The URL of the web page where the click is performed is referred to as link origin URL. As described above, in a case where the news site is selected from the book mark of the web browser, none is set in the referrer header.

Next, on the basis of the reference target URL, the gateway server 2 requests the web server 3 at the reference target to obtain the HTML file specified by the URL by the "HTTP GET" command. In a case where the specified HTML file exists and the access is not denied, the requested web server 3 returns the HTML file as a response to the "HTTP GET" command.

Figure 3:
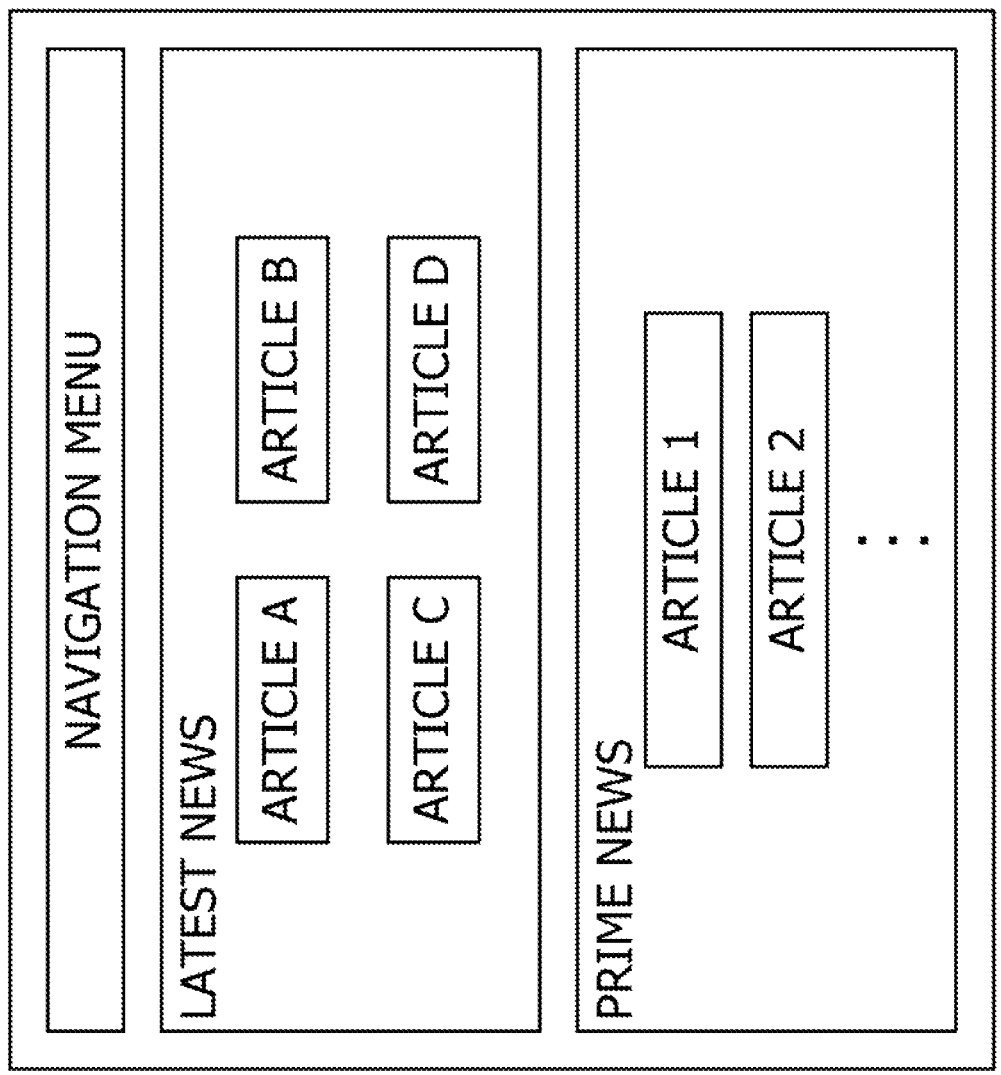
FIG. 3 is a schematic diagram showing a screen example of a general news site.

Subsequently, a process in a case where the gateway server 2 receives the HTML file will be described. FIG. 3 is a schematic diagram showing a screen example of a general news site. In an upper part of the web page, a navigation menu for moving down to sub pages of the site is provided. In addition to this, a similar navigation menu may be provided in a left part of the web page or the like. In one scenario, the web page has article blocks for sorting out articles into a few categories. Also, an individual article summary is described in the article block. Also, in general, a configuration is often adopted in which when a title of an individual article is clicked, it is possible to move into a detail page of the individual article.

It should be noted that a site also exists in which when the title of the article block of the web page is clicked, it is possible to move into a web page of the news full list in the category indicated by the clicked article block. The initial page of the news site shown in FIG. 3 has two article blocks (categories) including "latest news" and "prime news". The respective categories have individual articles (content) including "Article A", "Article B", "Article C", and "Article D", and "Article 1" and "Article 2".

Figure 4:
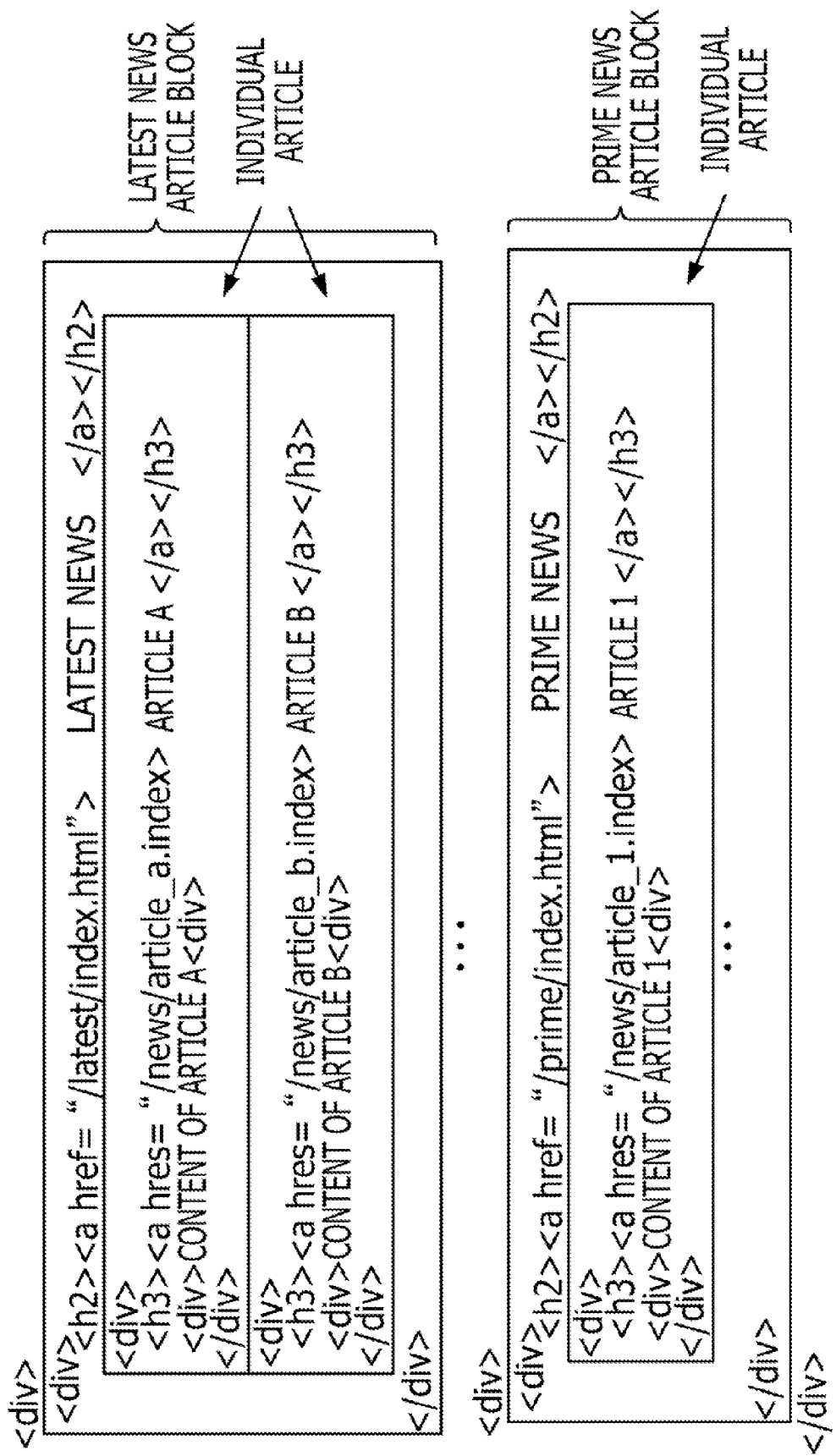
FIG. 4 is a schematic diagram showing an analysis example of an HTML document.

In a case where the HTML file is received from the web server 3, the gateway server 2 analyzes a structure of the HTML document in the HTML file. FIG. 4 is a schematic diagram showing an analysis example of the HTML document. In the analysis example shown in FIG. 4, the gateway server 2 determines a part from <div> tag to a </div> tag on an outer side surrounded by an <a> tag and an <h3> tag of HTML as one content. One content is one article. Also, the gateway server 2 determines the <a> tags surrounded by the <h3> tags as link destination URLs of the respective content. Furthermore, the gateway server 2 determines a part from the <div> tag to the </div> tag on an outer side surrounded by the <a> tag and an <h2> tag as a category to which the content belongs. The categories to which the respective content belong are article blocks. With this configuration, it is possible to extract the link destination URLs of the respective content and the categories to which the respective content belong. For example, the gateway server 2 may extract the link destination URLs of the respective articles and the article blocks in the example of FIG. 4.

It should be noted that a rule for the analysis is not limited to the above. Also, the analysis may be performed as the initial page of the news site in the above-mentioned example is structured, but the individual article may not be structured in many cases. In view of the above, for example, the gateway server 2 may select or determine a document of the URL ending with index.html as an initial page of the site or the category. Then, the gateway server 2 performs the extraction after the above-mentioned article block is structured. Also, the gateway server 2 may perform the extraction of the link information without performing the structuring.

FIG. 5 is a conceptual diagram showing an example of the non-reference list. The example shown in FIG. 5 illustrates the conceptual diagram of the non-reference list immediately after the gateway server 2 analyzes the HTML document received from the web server 3.

A "page URL" of the non-reference list shown in FIG. 5 is an entry where a URL of the web page the user accesses is stored. For example, "www.example.com/index.html" that the user accesses is stored. An "article block" is an entry where an article block name extracted at the time of the page analysis is stored. For example, values the "latest news" and the "prime news" are stored. An "article name" is an entry where an article name is stored. For example, a title of an article (as represented by "article A," "article B," and so on) is stored. A "link destination URL" is an entry where a URL included in an individual article in a particular article block (and used to access such an article) is stored. A "referred status" is an entry where a flag (Yes) is set in a case where the relevant article is referenced or referred to Currently, no reference is made to any of the articles, and therefore all the entries of the "referred status" are empty. That is, the "referred status" entry represents information as to whether a content of the articles have been transmitted to the mobile phone device 1 functioning as a client apparatus.

In a case where the content of the web page is not structured in the case of the individual article, the URL of the <a> tag existing in a particular tag within the web page may be set as the link destination URL. Of course, a URL other than this may also be set as the link destination URL.

The non-reference list is managed by a navigation information generation program of the gateway server 2 for each user. Therefore, it is desired for the web browser provided to the mobile phone device 1 and the navigation information generation program provided to the gateway server to exchange information for identifying the user. For example, as is performed in a usual web site, the mobile phone device 1 transmits a user ID and a password to the gateway server 2. Then, the gateway server 2 performs a user authentication and also issues to the web browser a session key which is to be used for a subsequent access. The web browser may assign a session key at the time of the access to the gateway server 2 to perform an HTTP communication. It should be noted that Cookie may be used for the session key. Alternatively, without performing the user authentication, the web browser may issue Cookie when an access is made for the first time to the gateway server 2. In that case, the web browser may assign Cookie at the time of the access to the gateway server 2 to perform the HTTP communication. It should be noted that Cookie is a mechanism for the web server 3 to temporarily save information in the web browser.

Subsequently, the gateway server 2 generates navigation information on the basis of the non-reference list. FIG. 6 shows an example of the navigation information which may be generated from the non-reference list shown in FIG. 5. The non-reference list shown in FIG. 5 shows a state in which when the web page registered in the "page URL" entry is referred to, the link destination to the content included in the web page is extracted. For the content, it is assumed that the "Article A", the "Article B", the "Article C", the "Article D", the "Article 1", and the "Article 2" are extracted. Also, the non-reference list indicates that no reference is yet made to the content specified from the respective link destinations. The generation unit 24 of the gateway server 2 includes a link to a non-reference content. Then, the generation unit 24 generates the navigation information as data which may be inserted into the HTML document. After the generated navigation information is inserted into the HTML document, the gateway server 2 returns the result to the mobile phone device 1 as a response to the "HTTP GET".

FIG. 7 shows an example of the HTML document returned from the gateway server 2. In a case where the HTML document shown in FIG. 7 is received, the web browser of the mobile phone device 1 extracts a part from <navi-lists> to </navi-lists>. Then, the web browser saves the extracted part as the navigation information. Furthermore, the web browser displays the HTML document from which the part from <navi-lists> to </navi-lists> is deleted. After that, when the user presses a particular key or touches the screen, the web browser uses the saved navigation information to overlap a navigation window on the content for the display.

Figure 8:
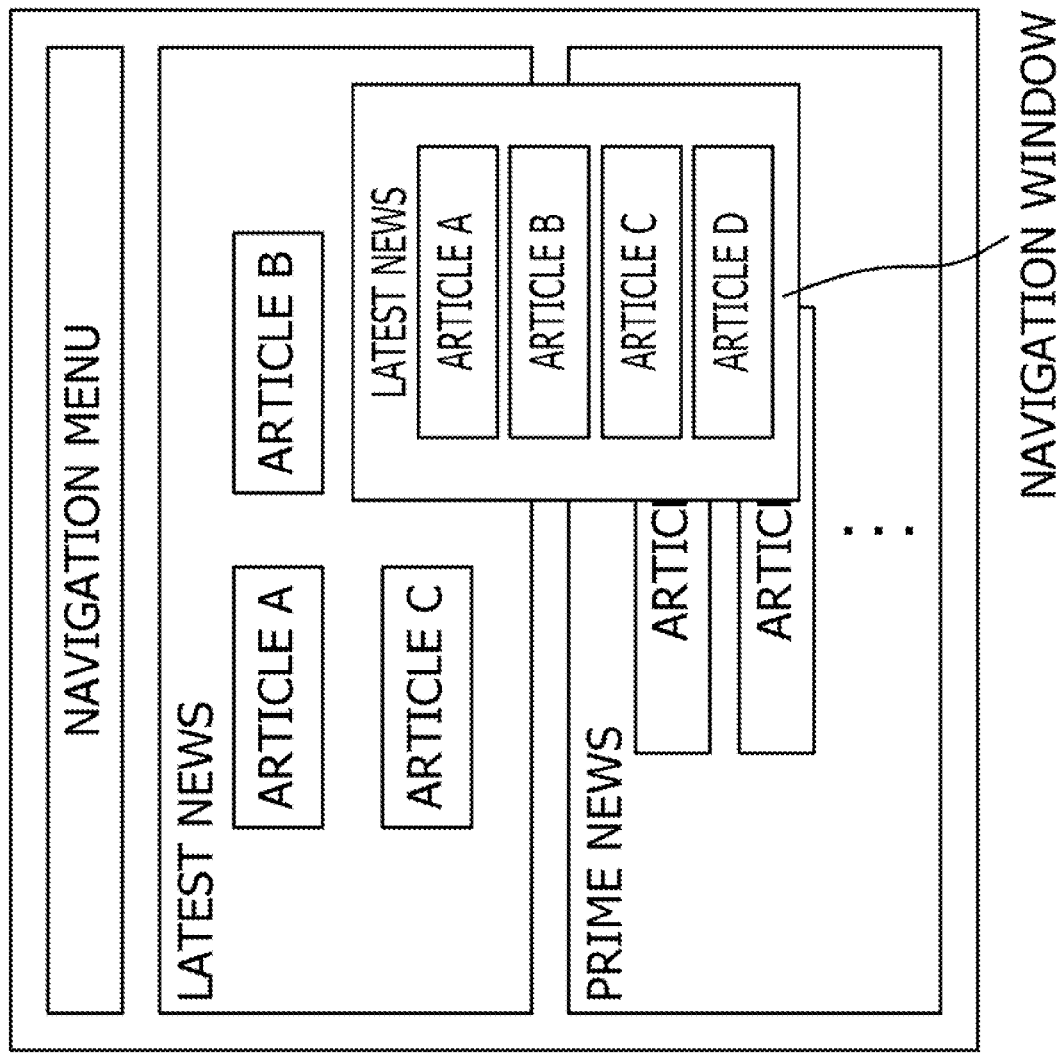
FIG. 8 is a schematic diagram showing a state in which a navigation window is displayed.

FIG. 8 is a schematic diagram showing a state in which the navigation window is displayed. In a case where the navigation window is displayed, the user presses and operates an operation key of the mobile phone device 1. Alternatively, the user touches the screen with the finger of the user. In response to the operation from the user, the web browser of the mobile phone device 1 displays the link destination for each article block.

Next, a description will be given of an operation in a case where the user selects and operates a link of the "Article A" on the navigation window of the web browser.

In a case where the user clicks the link of the "Article A" on the navigation window, the web browser sets "www.example.com/index.html" in the referrer header. Then, the web browser passes over the "HTTP GET" command and "www.example.com/latest/article_a.html" which is the URL of the article A to the gateway server 2. When the "HTTP GET" command is received, the gateway server 2 obtains "www.example.com/latest/article_a.html" as the reference target URL and "www.example.com/index.html" as the value of the referrer header. In a case where the referrer header may be obtained, the gateway server 2 refers to the non-reference list to determine whether or not the same URL as the reference target URL is registered in the "link destination URL" entry. It should be noted that a reference is made to the non-reference list where the same URL as the link origin URL included in the referrer header is registered in the "page URL" entry. As a result of the determination, the same URL exists, a flag "Yes" is set in the "referred status" entry of the relevant URL. FIG. 9 shows an example in which the referred link is deleted from the non-reference list. FIG. 9 shows that the link destination URL represented by "www.example.com/article_a.html" is already referred among the extracted link destination URLs.

Next, the gateway server 2 obtains the HTML document at "www.example.com/article_a.html". The gateway server 2 analyzes the structure of the obtained HTML document. "www.example.com/article_a.html" is a URL indicating an individual article. Thus, the gateway server 2 determines a part from <div> to </div> where the information amount (the number of character bytes) is largest as an article main body. Then, the gateway server 2 extracts the link information included in the HTML document. A character string surrounded by the <a> tags in the article main body is saved in the article block entry. FIG. 10 shows a content of the non-reference list after a new page reference is performed. It should be noted that in a case where "www.example.com/article_a.html" is a URL indicating an individual article, the article block does not exist. Thus, in FIG. 10, a field of the article block would be empty.

It should be noted that the gateway server 2 may automatically add the URL of the referrer header to the non-reference list as the navigation window for returning to the previous web page. For example, the gateway server 2 adds an article block "return" in the entry whose page URL is "www.example.com/article_a.html". Furthermore, the gateway server 2 may add "www.example.com/index.html" to the link destination URL.

Also, the above is similar to the analysis example of the initial page, and the rule for the analysis is not limited to the above.

Figure 11:
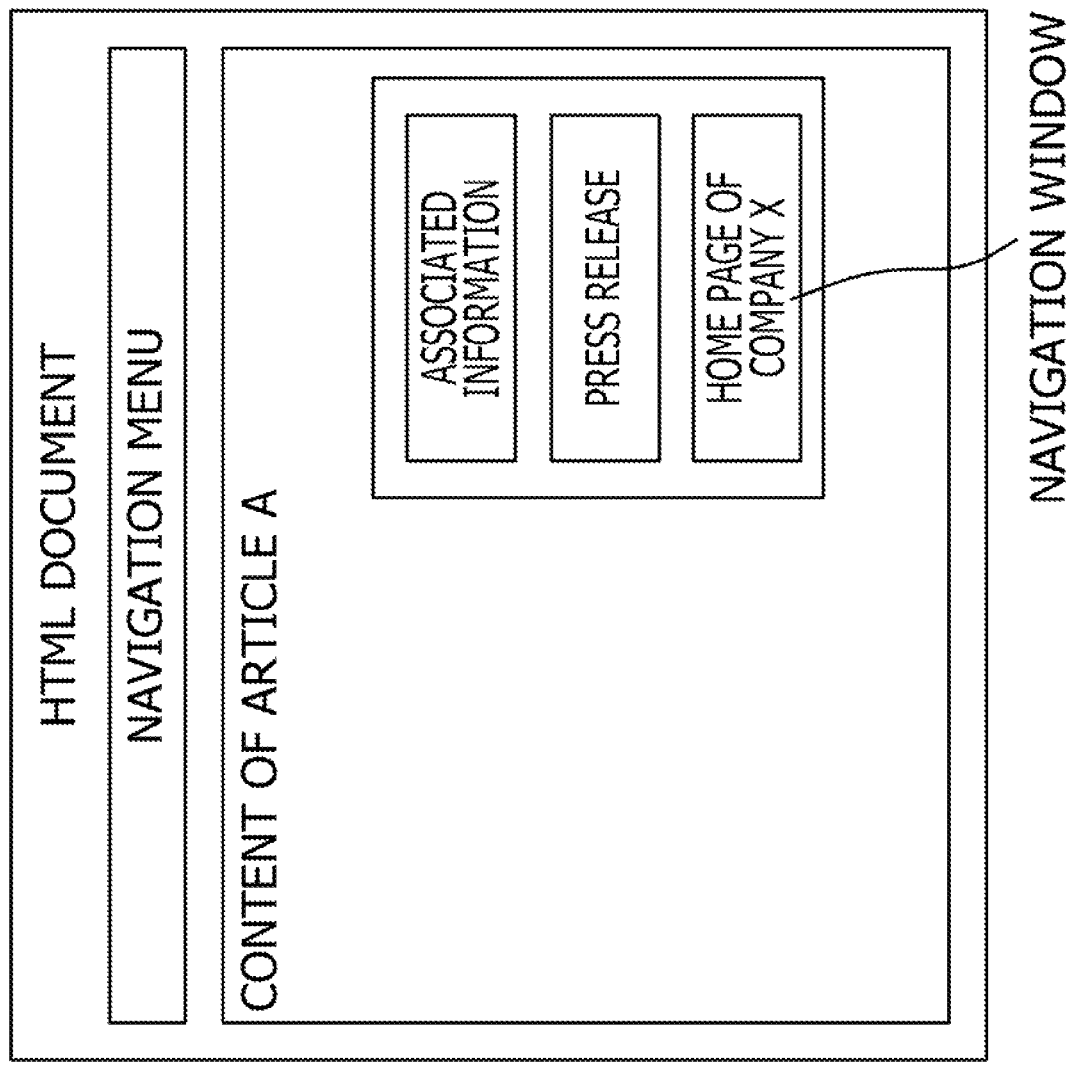
FIG. 11 shows a screen example in which the navigation window is displayed.

After that, similarly as in the above-mentioned flow, the gateway server 2 generates the navigation information. Then, after the generated navigation information is added to the HTML document, the gateway server 2 returns the HTML document to the web browser as a response to the "HTTP GET" command. Also similarly as in the above-mentioned flow, the web browser displays the content and the navigation window. FIG. 11 shows a screen example where the navigation window is displayed in this state.

Subsequently, a flow of a processing will be described in a case where the initial page of the news site is displayed again from the book mark of the web browser.

The web browser issues the "HTTP GET" command to the gateway server 2. Then, the gateway server 2 obtains the HTML document from the web server 3. In a case where the HTML document is received from the web server 3, the gateway server 2 analyzes the HTML document. It should be noted that the processing up to this point is similar to the above-mentioned flow.

In a case where the link information included in the analysis result is substantially the same as the analysis result of the previous time, the non-reference list is not updated. On the other hand, in a case where the analysis result is different, the gateway server 2 adds the article name and the link destination URL which are the differences to the non-reference list. Also, in a case where an article whose referred status entry is "Yes" is not included in the analysis result, the gateway server 2 deletes the entry related to the article from the non-reference list.

Figure 12:
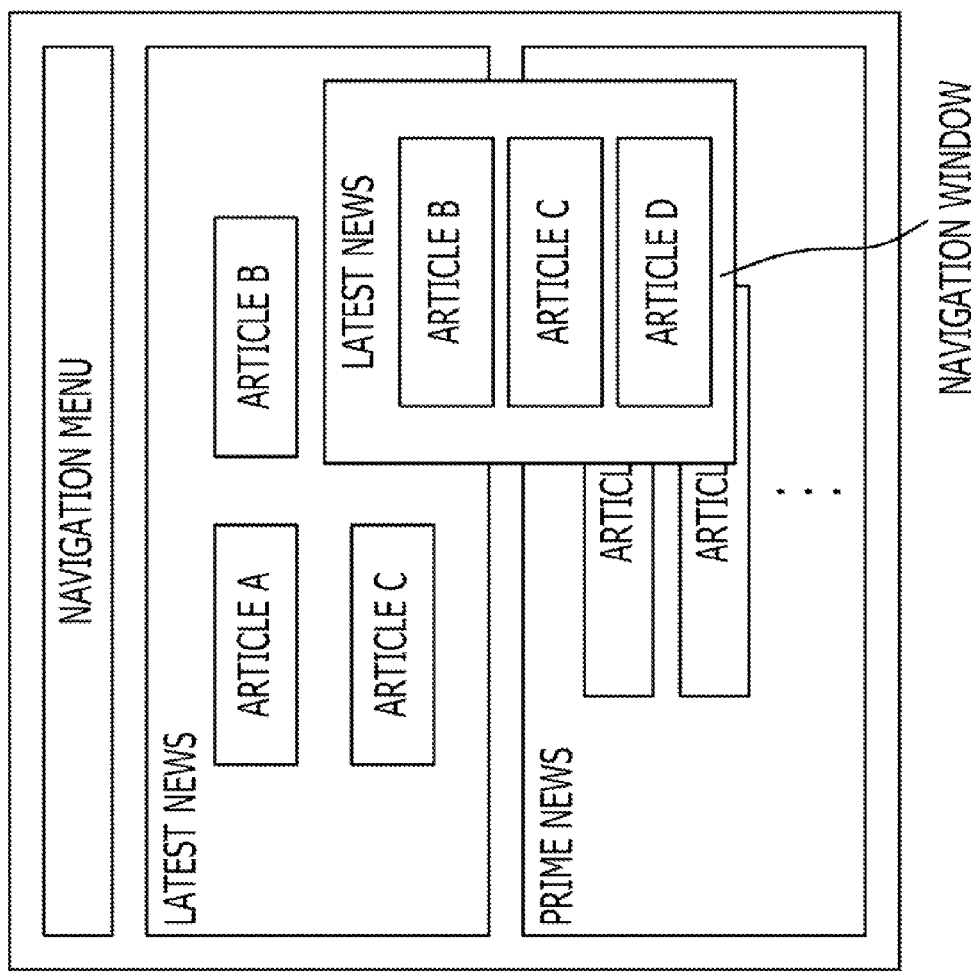
FIG. 12 shows a screen example in which the navigation window is displayed.

Subsequently, the gateway server 2 generates the navigation information that includes articles whose "referred status" entry in the non-reference list is not set as "Yes". Then, the generated navigation information is added to the HTML document to be returned to the web browser as a response to the "HTTP GET" command. FIG. 12 shows a screen example where the navigation window is displayed in this state. As the user refers to the "Article A" in the web browser, the link to the "Article A" is not displayed in the navigation window as shown in FIG. 12.

Figure 13:
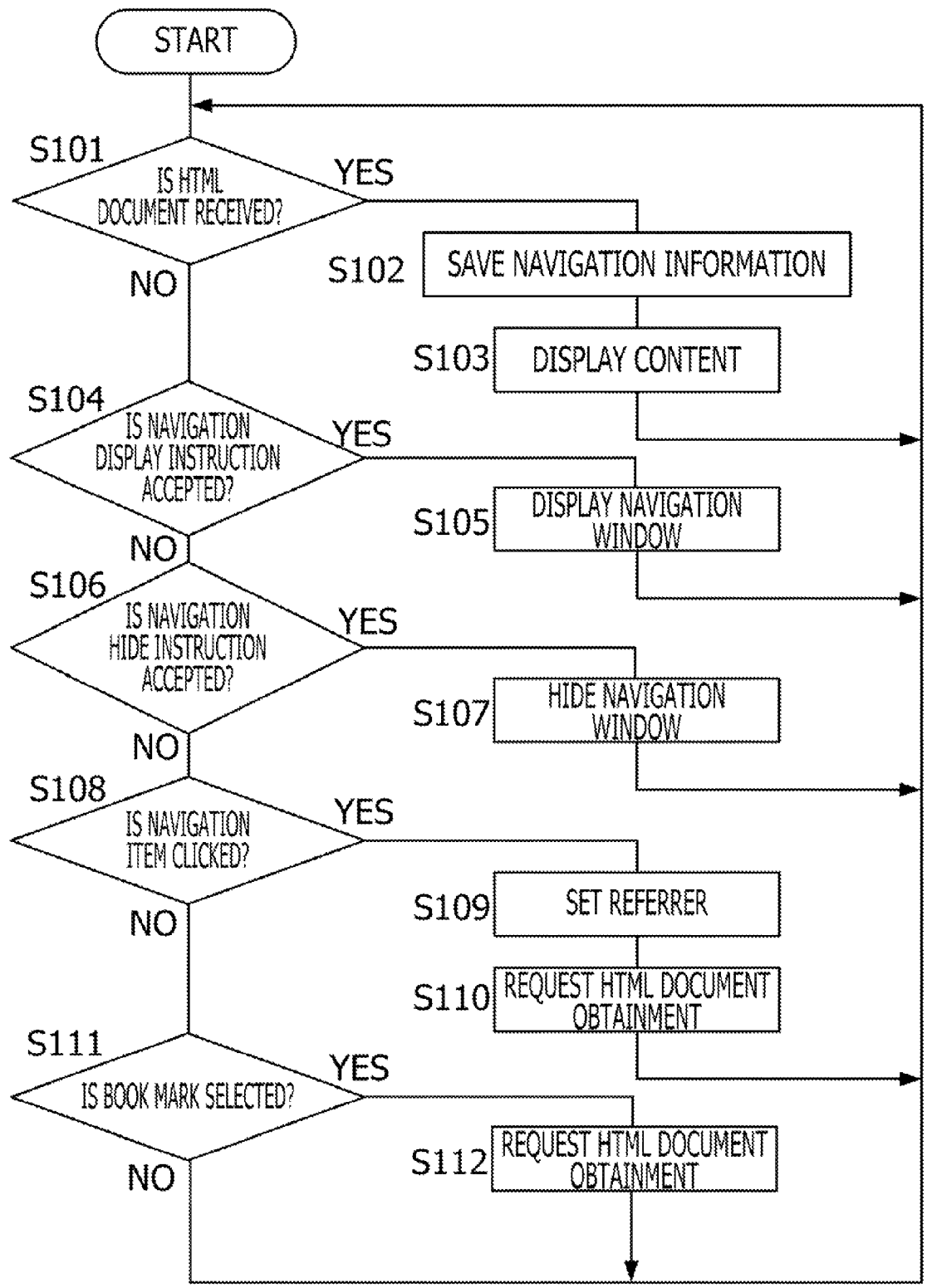
FIG. 13 is a flow chart for a processing procedure executed by the mobile phone device.

FIG. 13 is a flow chart executed by the mobile phone device 1. First, the mobile phone device 1 determines whether or not the HTML document is received from the gateway server 2 (S101). In a case where the HTML document is received (S101: YES), the mobile phone device 1 extracts the navigation information included in the HTML document. Then, the mobile phone device 1 saves the extracted navigation information (S102). Next, the mobile phone device 1 displays the content on the basis of the received HTML document (S103). After the content is displayed, the processing is returned to S101.

Also, the mobile phone device 1 determines whether or not the navigation display instruction is accepted (S104). In a case where the navigation display instruction is accepted (S104: YES), the mobile phone device 1 displays the navigation window on the currently displayed content (S105). After the navigation window is displayed, the processing is returned to S101.

Also, the mobile phone device 1 determines whether or not the navigation hide instruction is accepted (S106). In a case where the navigation hide instruction is accepted (S106: YES), the mobile phone device 1 hides the currently displayed navigation window (S107). After the navigation window is hided, the processing is returned to S101.

Also, the mobile phone device 1 determines whether or not the item is clicked in the currently displayed navigation window (S108). In a case where the item in the navigation window is clicked (S108: YES), the mobile phone device 1 sets the referrer (S109). The mobile phone device 1 transmits the obtaining request for the HTML document to the gateway server 2 (S110). After the obtaining request for the HTML document is transmitted, the processing is returned to S101.

Also, the mobile phone device 1 determines whether or not a web site in the bookmark is selected from the web browser (S111). In a case where it is determined that a web site in the bookmark is selected (S111: YES), the mobile phone device 1 transmits the obtaining request for the HTML document to the gateway server 2 (S112). In a case where a web site in the bookmark is not selected (S111: NO) or a case where the obtaining request for the HTML document is transmitted (S112), the processing is returned to S101.

It should be noted that the determination order for S101, S104, S106, S108, and S111 is not limited to the stated order, and an arbitrary order may be adopted.

Figure 14:
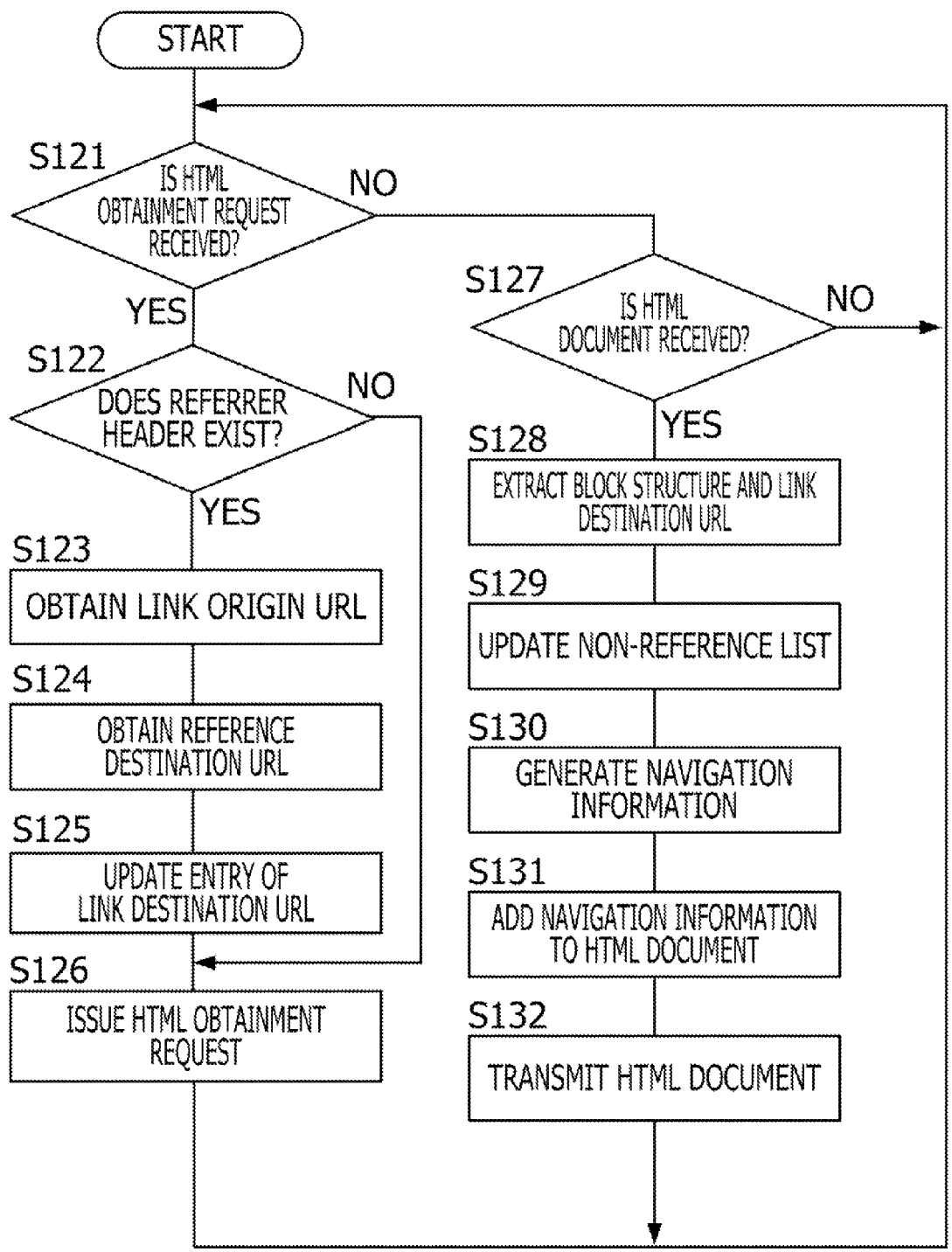
FIG. 14 is a flow chart for a processing procedure executed by the gateway server.

FIG. 14 is a flow chart executed by the gateway server 2. The gateway server 2 determines whether or not the HTML obtaining request is received from the mobile phone device 1 (S121). In a case where the HTML obtaining request is received (S121: YES), the gateway server 2 determines whether or not the referrer header exists (S122).

In a case where the referrer header does not exist (S122: NO), the gateway server 2 execute a processing in S126 which will be described later.

In a case where the referrer header exists (S122: YES), the gateway server 2 obtains the link origin URL from the referrer header (S123). The gateway server 2 obtains the reference target URL from the HTML obtaining request (S124). Next, the gateway server 2 updates the "link destination URL" entry with regard to the non-reference list where the web page corresponding to the referrer is registered in the "page URL" entry (S125). Then, the gateway server 2 issues the HTML obtaining request on the basis of the reference target URL (S126). The issued HTML obtaining request is transmitted to the relevant web server 3, and the gateway server 2 receives the HTML document from the web server 3.

On the other hand, in a case where it is determined that the HTML obtaining request is not received (S121: NO), the gateway server 2 determines whether or not the HTML document is received (S127). In a case where the HTML document is not received (S127: NO), the processing is returned to S121.

In a case where the HTML document is received (S127: YES), the gateway server 2 extracts the block structure of the article and the link destination URL in the block from the HTML document (S128). The gateway server 2 updates the non-reference list (S129). It should be noted that in a case where the URL of the received HTML document is received for the first time, a new non-reference list is created. Also, in a case where the URL of the received HTML document is the same as the "page URL" in the existing non-reference list, the entries of the "Article block", the "Article name", the "link destination URL", and the "referred status" are updated.

Next, the gateway server 2 generates the navigation information from the non-reference list (S130). The gateway server 2 adds the navigation information to the HTML document (S131). Then, the HTML document to which the navigation information is added is transmitted to the mobile phone device 1 (S132). The mobile phone device 1 serves as the client.

As described above, according to the embodiment, on the basis of the page reference by the user, the list of the non-reference pages for each web page is managed. Then, the gateway server 2 includes the non-reference pages at the time of the navigation information generation. With this configuration, it is possible to display the navigation information that includes the non-reference pages when the user accesses the web page next time. Thus, the operability and usability for the user are improved.

Figure 15:
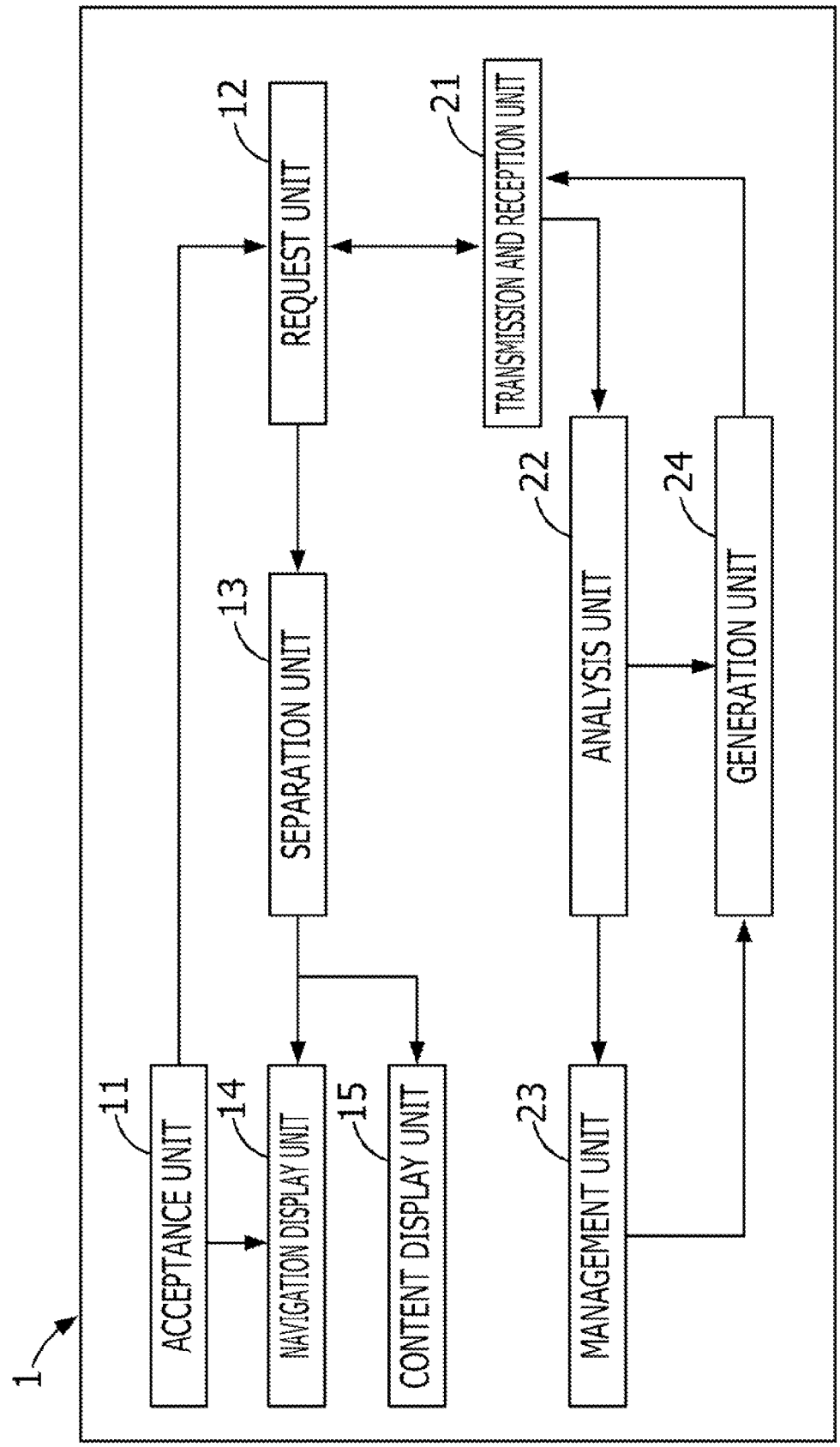
FIG. 15 is a function block diagram of a mobile phone device having a configuration for generating the navigation information.

It should be noted that according to the embodiment, the HTML analysis, the non-reference list management, and the like are performed by the gateway server 2. However, these processing may be performed on the mobile phone device 1 side. Also, these processing may be performed within the web browser. FIG. 15 is a function block diagram of a mobile phone device having a configuration for generating navigation information. As shown in FIG. 15, the transmission and reception unit 21, the analysis unit 22, the management unit 23, and the generation unit 24 shown in FIG. 2 are provided to the mobile phone device 1.

According to the above-referenced embodiment, regarding the web page referred by the user with use of the navigation window, the referred status entry of the non-reference list is checked. However, the web pages which are not yet referred also include web pages which are not referred because the user is not interested in. Thus, the web pages which the user is not interested in are preferably not included in the navigation window although the web pages which are not yet referred. According to an embodiment, "Yes" is set in the referred status entry even in the case of the link destination web page which is not actually referred by the user. To be more specific, according to the embodiment, in accordance with a reference pattern of the web pages of the user, "Yes" is set in the referred status entry at a time when it is identified that the user skips reading.

It should be noted that the configurations of the mobile phone device 1 and the gateway server 2 according to the embodiment are similar to those of the above-referenced embodiment. According to the embodiment, in accordance with the reference pattern of the web pages of the user, the management unit 23 deletes information of the web page which is not actually referred by the user from the non-reference list.

FIG. 16 is a conceptual diagram showing an example of the non-reference list according to the embodiment. According to the embodiment, the non-reference list has a "previously selected" reference entry. The "previously selected" reference entry indicates which link destination URL is selected when the web page is displayed in the previous time. For example, FIG. 16 shows the non-reference list in a case where the link of the "Article A" is selected on the initial page of the news site. In a case where on the initial page, the user further selects an article of the article block of the "prime news" other than the article block of the "latest news" including the "Article A" selected in the previous time, the gateway server 2 regards articles other than the "Article A" of the "latest news" as browsed. In other words, the gateway server 2 sets "Yes" in the referred status entries of the articles other than the "Article A" included in the article block of the "latest news." FIG. 17 shows an example of the non-reference list updated at a timing of another block reference. To be more specific, FIG. 17 shows the non-reference list when a reference is made to the article 1 of the "prime news" article block on the initial page of the news site. In a case where the user accesses the initial page of the news site next time, the links to the "Article B", the "Article C", and the "Article D" are not displayed in the navigation window.

Also, as another method, the gateway server 2 may save the latest reference URL for each web browser. In order to identify the web browser, this may be realized while the gateway server 2 sets a unique ID for identifying itself from the web browser in the HTTP header. The gateway server 2 first receives new "HTTP GET" command and reference target URL. Then, in a case where the referrer header does not exist and also the latest reference URL in which the reference target URL corresponds to the web browser and the domain are changed, the gateway server 2 sets "Yes" in the referred status entries of all the articles of the article block including the article selected in the previous time. For example, while the non-reference list is in a state shown in FIG. 16, when "www.other-example.com/index.html" is selected from the initial page of the news site, all the articles of the news site are regarded as browsed, "Yes" is set in the referred status entries of all the articles on the initial page of the news site. The non-reference list is as shown in FIG. 18. That is, FIG. 18 shows an example of the non-reference list updated at a timing of another domain reference. It should be noted that as the gateway server 2 checks the existence of the referrer header, it is possible to take into account a case in which the link of the article is another domain.

In the above-mentioned two examples, at the time of another block reference or the time of another domain reference, "Yes" is set in the referred status entry of a certain content in the non-reference list. However, the gateway server 2 may temporarily set "Pending" in a state in which the setting of "Yes" in the referred status entry is temporarily suspended. The state in which the setting of "Yes" in the referred status entry is temporarily suspended is referred to as tentative deletion state. To be more specific, while the non-reference list is the state shown in FIG. 16, in a case where the user selects "www.other-example.com/index.html" from the initial page of the news site, the non-reference list is as shown in FIG. 19. That is, FIG. 19 shows an example of the non-reference list having the tentative deletion state. In a case where the user accesses the initial page of the news site again, an example of the navigation information generated by the gateway server 2 is as shown in FIG. 20.

The web browser receiving the navigation information shown in FIG. 20 displays the link destination in which "Pending" is set in such a manner that the pending state is explicit. FIG. 21 is a schematic diagram showing an example of the navigation window having the tentative deletion state. In FIG. 21, the links to the respective articles are displayed in reversing display to indicate that the link destinations are different from the normal link destination. It should be noted that any display method may be adopted as long as the user may distinguish the tentatively deleted link. For example, the display method may be a display method of displaying the link destinations in a different color from a color for the normal link destination.

Also, the gateway server 2 may hold a time at which the tentative deletion state is set. Then, when a certain period of time elapses, the gateway server 2 may set the non-reference list in the referred status. Alternatively, the gateway server 2 may hold the number of displays of the relevant web page from a time point when the tentative deletion state is set. For example, in the above-mentioned example, the number of displays of the initial page of the news site is held. Then, when one web page is displayed at least a certain number of times, the gateway server 2 may set the non-reference list in the referred status. With this configuration, until a certain period of time elapses or until an access is made to the initial page by a certain number of times, the non-reference link destination is displayed in the navigation window. Thus, a situation is avoided in which the link to the non-reference URL is deleted from the navigation window in a case where a reference is accidentally made to another site through an erroneous operation or the like.

Also, in a case where the reference target URL transmitted by the "HTTP GET" command is included in the non-reference list of the web page other than the referrer, the gateway server 2 may set "Yes" in the referred status entry of the link destination URL of the web page. FIG. 22 and FIG. 23 show examples of the non-reference list including the same link destination URL. For example, a case will be described in which while the non-reference list is the state shown in FIG. 22, an access is made to the "Article A" from the initial page of the news site by using the navigation window. Not only the "Article A" in the selected latest news but also an article including the same URL are also set in the referred status. In the case of FIG. 23, "media" is also set in the referred status.

Also, the article name of the reference target URL transmitted by the "HTTP GET" command may be the same as or similar to the article name of the non-reference list of the web page other than the referrer in some cases. In that case, the gateway server 2 may set "Yes" in the referred status entry of the link destination URL of the web page. FIG. 24 and FIG. 25 show examples of the non-reference list including a similar article name. For example, it is presumed that while the non-reference list is the state of FIG. 24, the user accesses "Company X releases new product YYY!" from the initial page of the news site by using the navigation window. The gateway server 2 sets not only "Company X releases new product YYY!" in the selected latest news but also an article including a similar article name as in the referred status. In other words, the non-reference list of FIG. 25 is generated. It should be noted that for the determination on the similar article name, for example, the article name is subjected to a morpheme analysis, and it is possible to determine that the article name is similar in a case where words are included at a certain ratio. Of course, the degree of similarity may be determined through a method other than the above.

Also, the user may provide inputs or selections for explicitly setting all in the referred status, the tentative deletion, the cancellation of the referred status, and the cancellation of the tentative deletion. For example, when the user selects a "referred status" menu in the web browser menu, the gateway server 2 sets all the non-reference lists related to the web page in the referred status.

Figure 26:
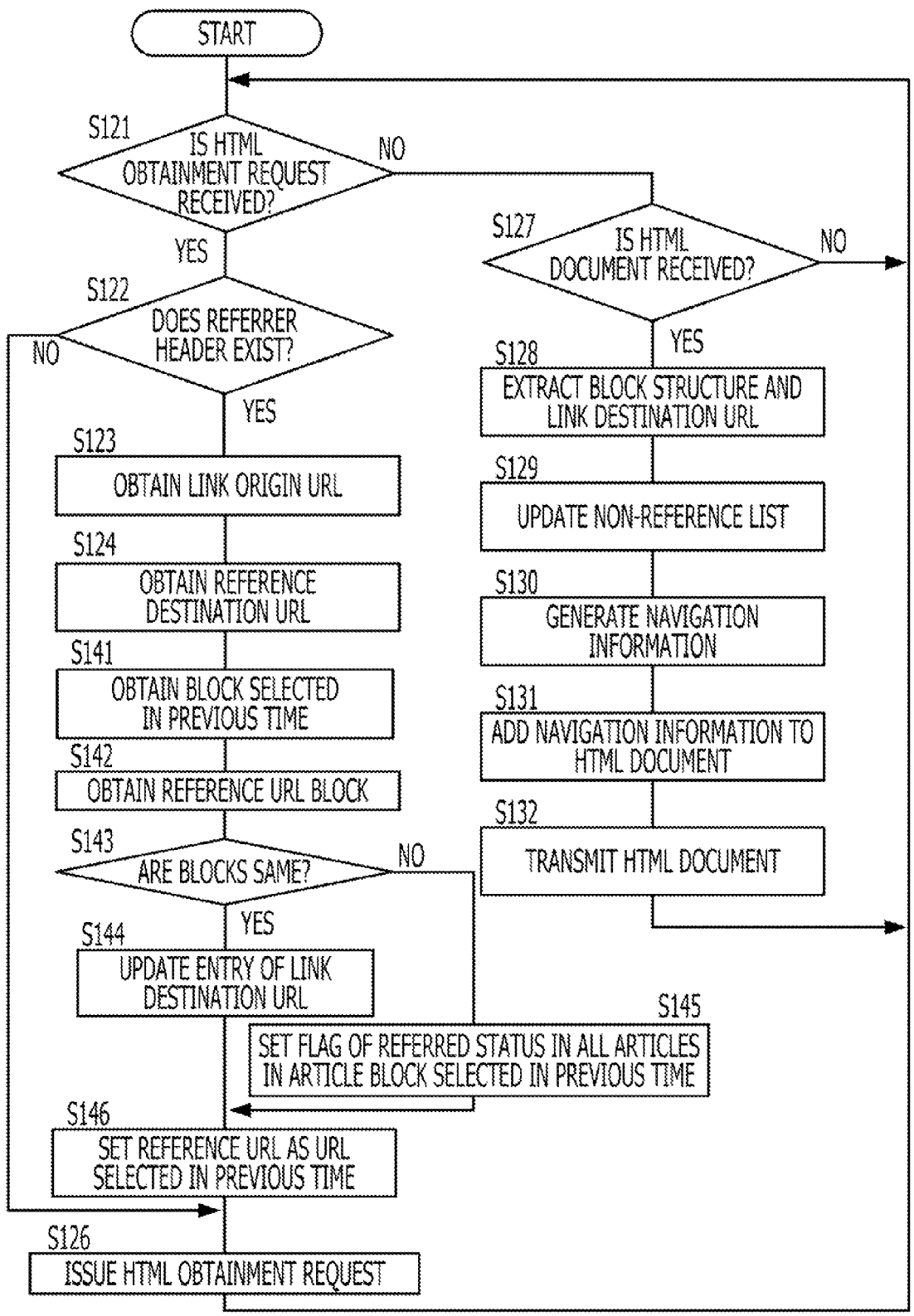
FIG. 26 is a flow chart for a processing procedure executed by the gateway server when a block is changed.

FIG. 26 is a flow chart executed by the gateway server 2 when a block is changed. It should be noted that in the present flow chart illustrated in FIG. 26, substantially the same processing as that shown in FIG. 14 is assigned with the same symbol, and a description thereof will be omitted. After the reference target URL is obtained from the HTML document request (S124), the gateway server 2 obtains the block selected in the previous time (S141). Then, the gateway server 2 obtains the reference URL block (S142).

Next, the gateway server 2 determines whether or not the block obtained in S141 is substantially the same as the block obtained in S142 (S143). In a case where it is determined that the blocks are substantially the same (S143: YES), the gateway server 2 updates the "link destination URL" entry with regard to the non-reference list where the web page corresponding to the referrer is registered in the "page URL" entry (S144). On the other hand, in a case where it is determined that the blocks are not substantially the same (S143: NO), the gateway server 2 regards the link destination URLs of all the articles of the block selected in the previous time as browsed and sets the flag of the referred status in all the articles of the block selected in the previous time (S145).

After the entry is updated in S144 or S145, the gateway server 2 updates the "previously selected" entry to set the reference target URL as the URL selected in the previous time (S146). After the previously selected entry is updated, the gateway server 2 issues the HTML obtaining request to the request URL (S126).

Figure 27:
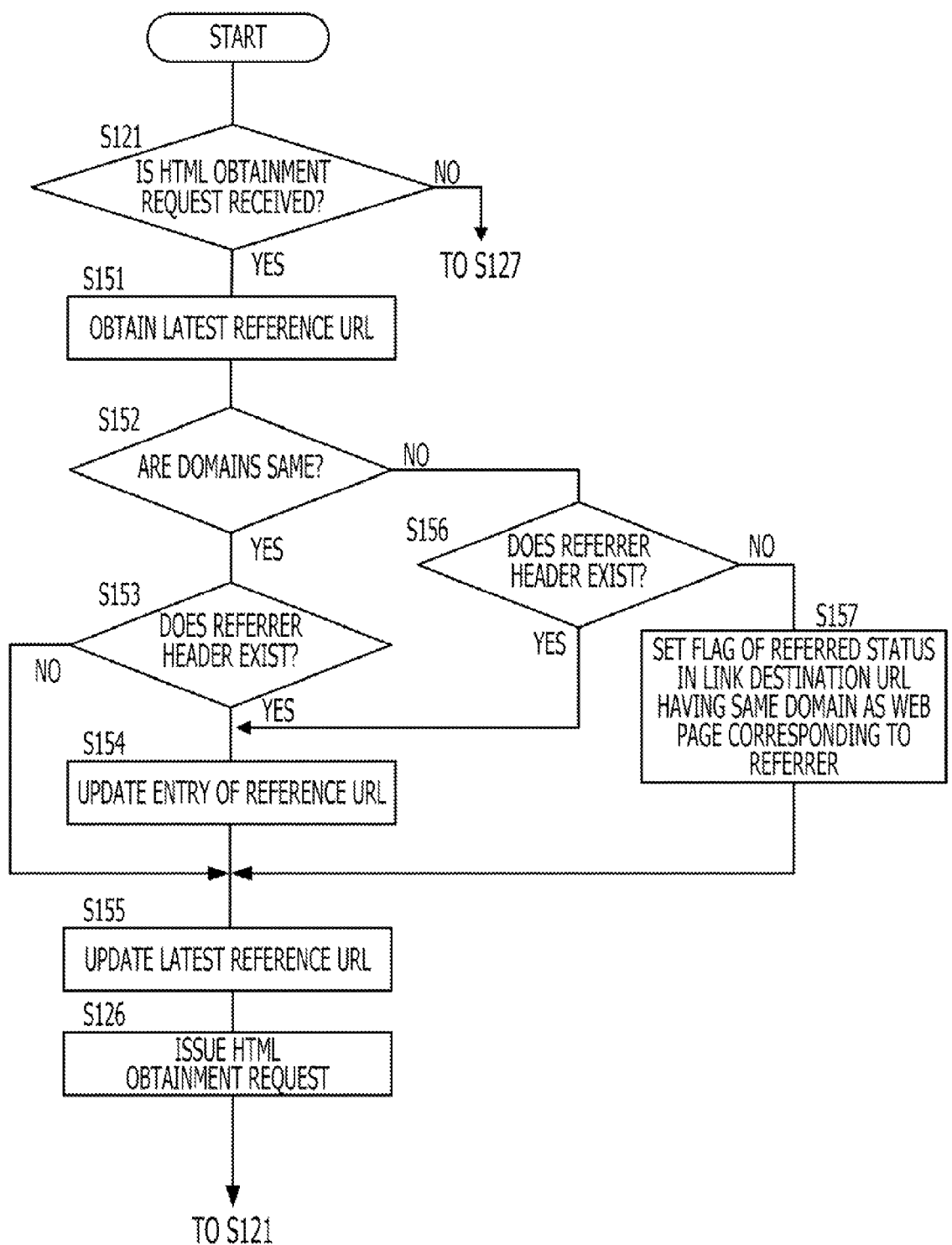
FIG. 27 is a flow chart for a processing procedure executed by the gateway server when a domain is changed.

FIG. 27 is a flow chart executed by the gateway server 2 when a domain is changed. It should be noted that in the present flow chart, substantially the same processing as that shown in FIG. 14 is assigned with the same symbol, and a description thereof will be omitted. In a case where it is determined in S121 that the HTML obtaining request is received (S121: YES), the gateway server 2 obtains the latest reference URL referred by the requesting web browser (S151). Next, the gateway server 2 determines whether or not the domain of the URL referred in the previous time is the same as the domain of the latest reference URL (S152).

In a case where it is determined that the domains are the same (S152: YES), the gateway server 2 determines whether or not the referrer header exists in the HTML obtaining request (S153). In a case where it is determined that the referrer header does not exist (S153: NO), the processing in S155 and subsequent operations are executed.

In a case where it is determined that the referrer header exists (S153: YES), the gateway server 2 updates the "link destination URL" entry with regard to the non-reference list where the web page corresponding to the referrer is registered in the "page URL" entry (S154). Also, the gateway server 2 updates the latest reference target of the web browser (S155). Then, the gateway server 2 issues the HTML obtaining request (S126).

In a case where it is determined in S152 that the domain of the URL referred in the previous time is different from the domain of the latest reference URL (S152: NO), the gateway server 2 determines whether or not the referrer header exists in the HTML obtaining request (S156). In a case where it is determined that the referrer header exists (S156: YES), the processing in S154 and subsequent operations are executed. On the other hand, in a case where it is determined that the referrer header does not exist (S156: NO), the gateway server 2 regards the link destination URLs of all the articles having the same domain as the web page corresponding to the referrer as browsed. In other words, the gateway server 2 sets the flag of the referred status for these articles (S157).

Figure 28:
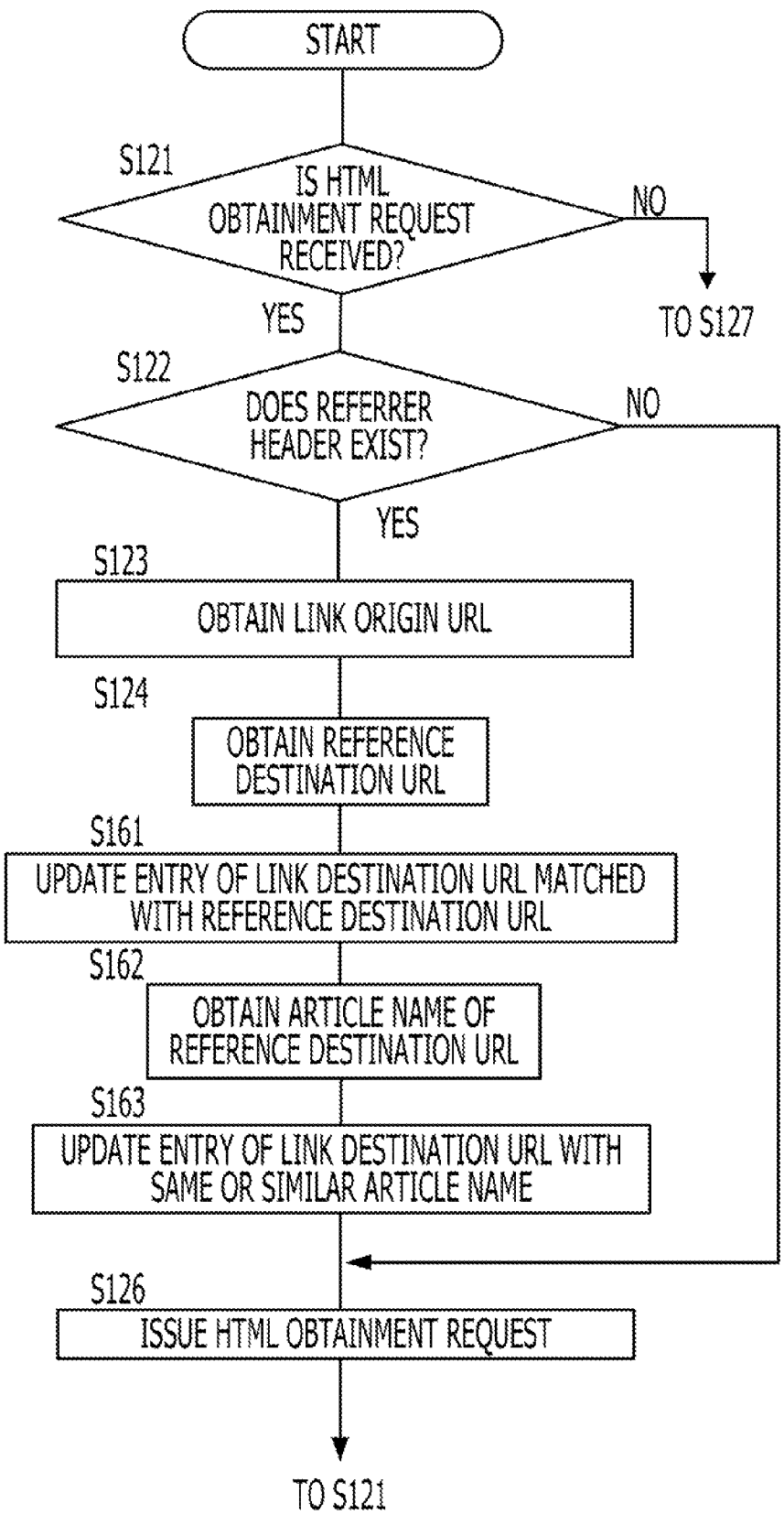
FIG. 28 is a flow chart for a processing procedure executed by the gateway server when the same name article or a substantially similar article name exists.

FIG. 28 is a flow chart executed by the gateway server 2 when the same name article or a similar article name exists. It should be noted that in the present flow chart, substantially the same processing as that shown in FIG. 14 is assigned with the same symbol, and a description thereof will be omitted. After the reference target URL is obtained from the HTML document request (S124), the gateway server 2 searches in the non-reference list. Then, the gateway server 2 updates the entry of the link destination URL matched with the reference target URL (S161).

Next, the gateway server 2 obtains the article name in which the link destination URL of the web page of the referrer is the reference target URL (S162). The gateway server 2 searches in the non-reference list and updates the entry of the link destination URL where the article name is the same or similar (S163).

After the entry of the link destination URL where the article name is the same or similar is set, the gateway server 2 issues the HTML obtaining request to the request URL (S126).

As described above, according to the embodiment, on the basis of the page reference pattern of the user, the web page which is not actually referred by the user is deleted from the list of the non-reference pages. With this configuration, the non-reference page the user is not interested in is not included in the navigation information, and the operability and usability for the user are improved.

According to an embodiment, an update monitoring while the user does not access the web page will be described.

Figure 29:
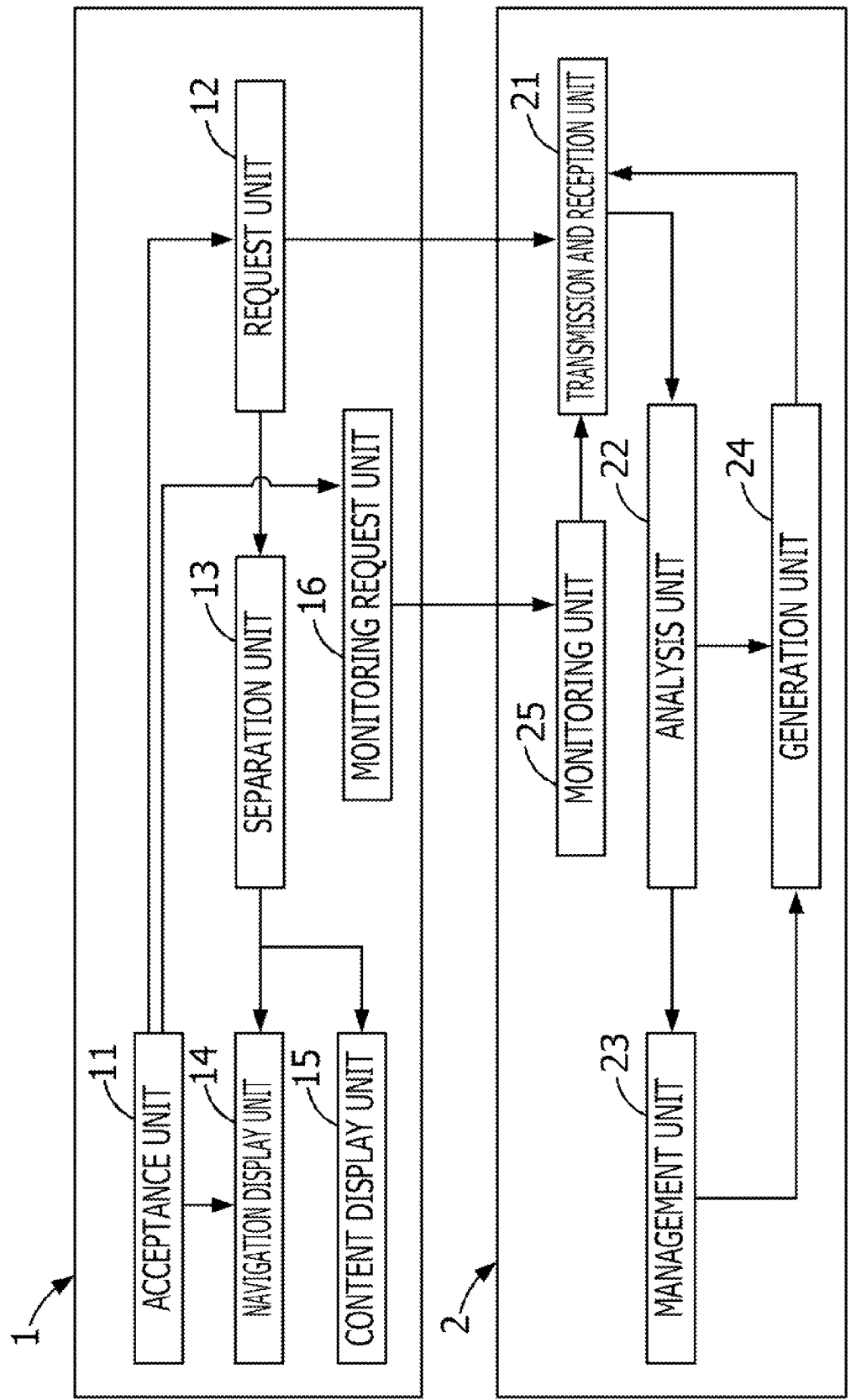
FIG. 29 is a function block diagram of the mobile phone device and the gateway server according to a embodiment.

FIG. 29 is a function block diagram of the mobile phone device 1 and the gateway server 2 according to the embodiment. The mobile phone device 1 is further provided with a monitoring request unit 16 in addition to the configuration shown in FIG. 2. On the basis of the input from the user, the monitoring request unit 16 requests monitoring an update of a reference page. Also, the gateway server 2 manages monitoring the update of information on the specified web page. Then, the gateway server 2 is further provided with a monitoring unit 25. The monitoring unit 25 requests the transmission and reception unit 21 to periodically obtain information on the specified web page. Then, the gateway server 2 periodically obtains the information on the web page on the basis of the input from the monitoring request unit 16.

It should be noted that the web browser for displaying the content and the navigation information is operated on the mobile phone device 1. Then, it is assumed that the navigation generation program for generating the navigation information is operated on the gateway server 2.

In a case where the user issues an update monitoring instruction from the menu of the web browser, the web browser transmits an update monitoring command to the gateway server 2. The update monitoring command may also be transmitted by way of an HTTP communication. Also, the web browser may start a new communication with the gateway server 2 to transmit the update monitoring command. In a case where the update monitoring command is transmitted by way of the HTTP communication, the web browser uses, for example, an "HTTP POST" command to transmit the update monitoring command to the gateway server 2. Of course, the command may be transmitted though a method other than this.

According to the embodiment, the web browser transmits the update monitoring command and the URL of the currently referred web page to the gateway server 2. In a case where the gateway server 2 receives the update monitoring command, the URL of the web page being referred is obtained. Then, the gateway server 2 saves the obtained URL as the monitoring target. After that, the gateway server 2 periodically receives the HTML document on the basis of the URL of the web page of the monitoring target. The gateway server 2 analyzes the content of the received HTML document as described above. Then, the gateway server 2 updates the non-reference list as desired or needed.

It should be however noted that after the non-reference list is updated, the gateway server 2 does not generate the navigation information and notify the web browser of the HTML document. In this embodiment, the web browser transmits the URL of the web page being referred, but the gateway server 2 holds the latest URL referred for each web browser. Then, the web browser may adopt a method of transmitting the update monitoring command.

After that, the web browser accesses the web page of the monitoring target, the gateway server 2 deletes the URL of the web page from the monitoring target. Furthermore, the gateway server 2 obtains the HTML document from the web server 3. Then, the gateway server 2 updates the non-reference list and generates the navigation information. After that, the gateway server 2 returns the HTML document to which the navigation information is added to the web browser.

Figure 30A:
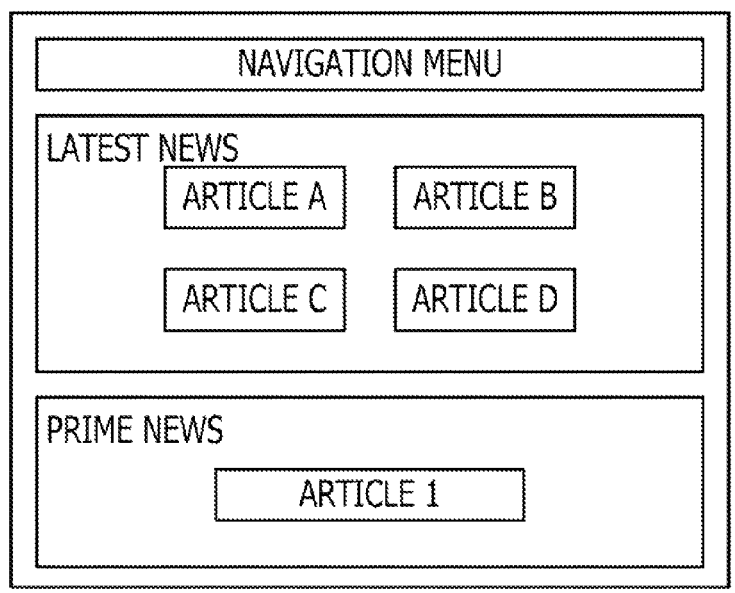
FIG. 30A and FIG. 30B show screen examples of the navigation window after monitoring is performed.
Figure 30B:
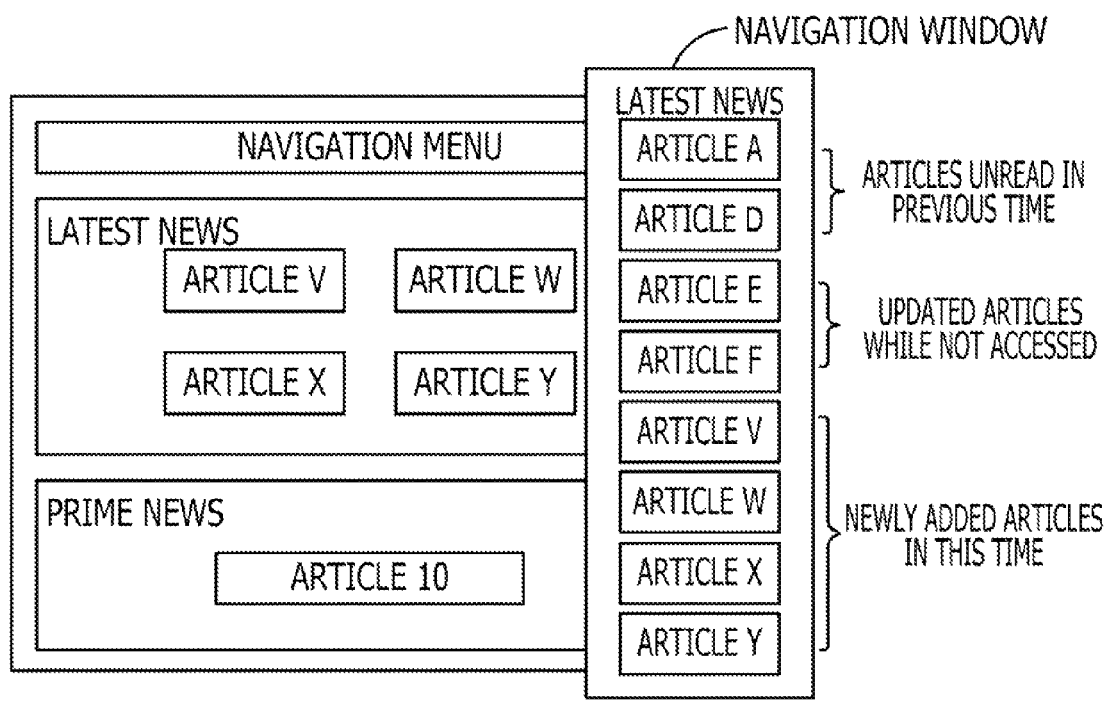

FIG. 30A shows a screen example of the navigation window before the monitoring, and FIG. 30B shows a screen example of the navigation window after the monitoring. The article block of the "latest news" has the "Article A", the "Article B", the "Article C", and the "Article D". Then, it is assumed that the user refers to the "Article B" and the "Article C". Then, in a case where the update monitoring is instructed by the user, the screen is turned into the screen of FIG. 30B.

While the gateway server 2 periodically performs the update monitoring on the web page, it is assumed that "Article E" and "Article F" are added to the article block of the "latest news". Furthermore, while the update monitoring is performed, the "Article E" and the "Article F" are already deleted from the "latest article block", and it is assumed that "Article V", "Article W", "Article X", and "Article Y" are newly added. According to the first and embodiments, as the currently browsed web page does not include the "Article E" and the "Article F", the navigation window including links to the "Article A", the "Article D", the "Article V", the "Article W", the "Article X", and the "Article Y" is displayed. On the other hand, the "Article E" and the "Article F" are not displayed in the navigation window.

As shown in FIG. 30B, according to the embodiment, it is possible to also add the "Article E" and the "Article F", which are added while the user does not accesses the web page, to the navigation window. Thus, the user may easily move to the "Article E" and the "Article F".

In the above-mentioned example, the gateway server 2 starts the update monitoring on the web page as the user instructs the update monitoring from the menu of the web browser. The web browser may transmit the update monitoring command to the gateway server 2 at a certain timing irrespective of the instruction of the user.

Figure 31:
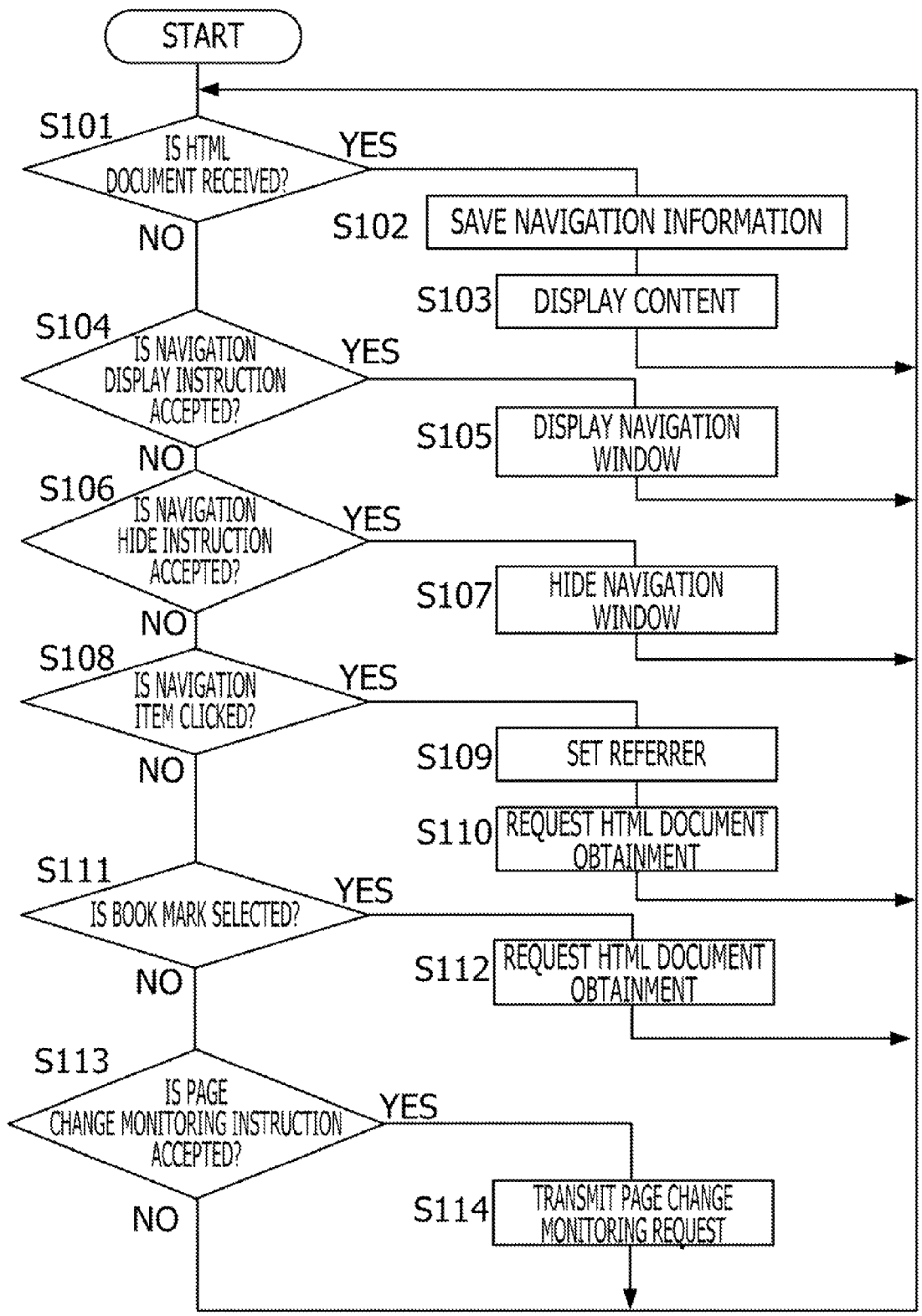
FIG. 31 is a flow chart for a processing procedure executed by the mobile phone device.

FIG. 31 is a flow chart executed by the mobile phone device 1. It should be noted that in the present flow chart, substantially the same processing as that shown in FIG. 13 is assigned with the same symbol, and a description thereof will be omitted. Similarly as in FIG. 13, the mobile phone device 1 determines whether or not the page change monitoring instruction is accepted through the web browser (S113).

In a case where the page change monitoring instruction is not accepted (S113: NO), the mobile phone device 1 returns the processing to S101. In a case where the page change monitoring instruction is accepted (S113: YES), the mobile phone device 1 transmits the page change monitoring instruction to the gateway server 2 (S114).

Figure 32:
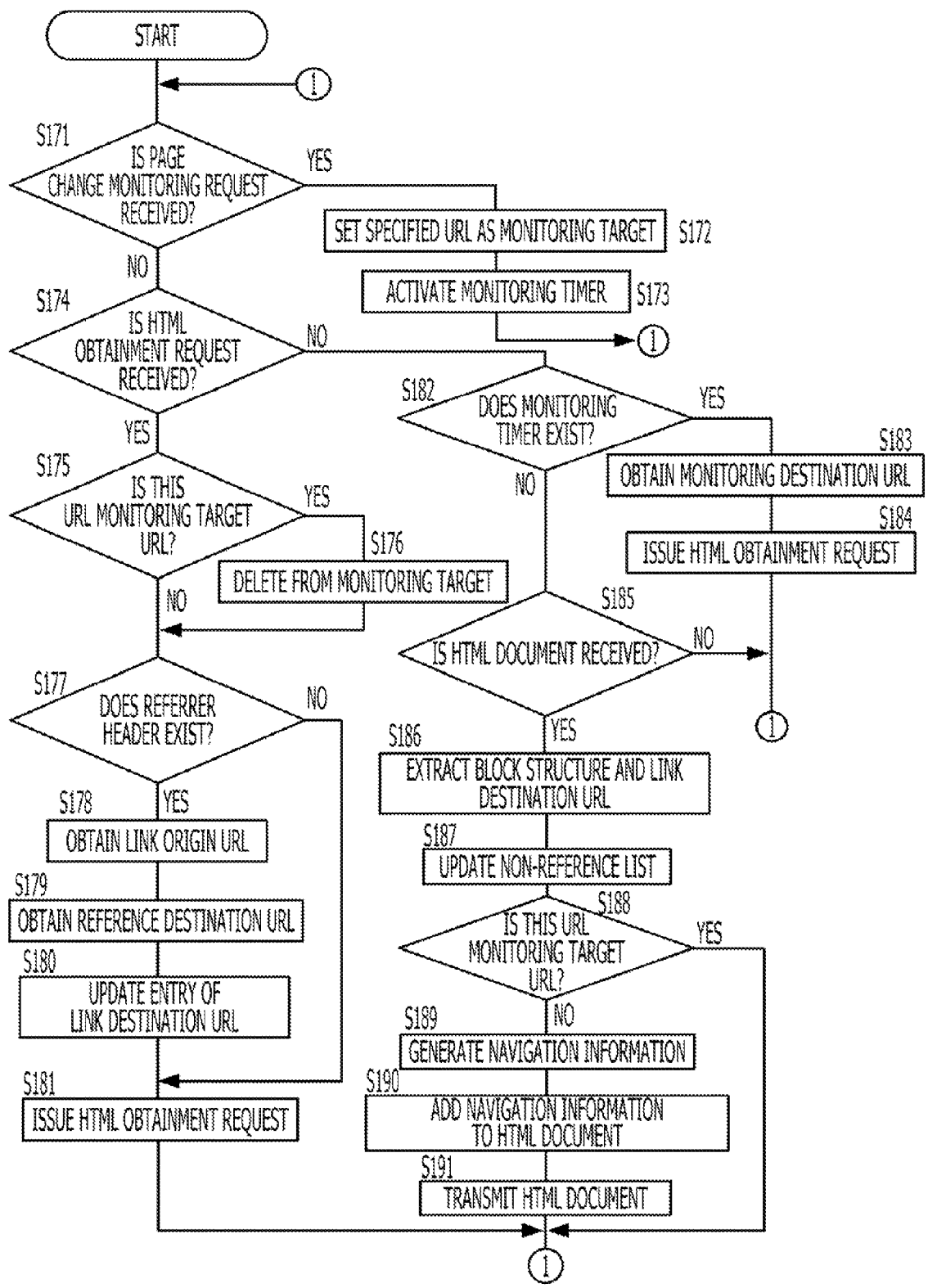
FIG. 32 is a flow chart for a processing procedure executed by the gateway server.

Next, a processing procedure executed by the gateway server 2 will be described. FIG. 32 is a flow chart executed by the gateway server 2. The gateway server 2 determines whether or not the page change monitoring instruction transmitted from the mobile phone device 1 is received (S171). In a case where the page change monitoring instruction is received (S171: YES), the gateway server 2 adds the specified URL to the monitoring target (S172). The gateway server 2 activates a monitoring time (not shown) with regard to a specified URL (S173). After the monitoring timer is activated, the gateway server 2 returns to S171.

In a case where the page change monitoring instruction is not received (S171: NO), the gateway server 2 determines whether or not the HTML obtaining request transmitted from the mobile phone device 1 is received (S174). In a case where the HTML obtaining request is received (S174: YES), the gateway server 2 determines whether or not the URL requested to be obtained is the monitoring target URL (S175). In a case where the URL requested to be obtained is the monitoring target URL (S175: YES), the gateway server 2 stops the monitoring timer. Then, the gateway server 2 deletes the URL requested to be obtained from the monitoring target (S176).

In a case where the URL requested to be obtained is not the monitoring target URL (S175: NO) or a case where the URL requested to be obtained is deleted from the monitoring target (S176), the gateway server 2 determines whether or not the referrer header exists in the HTML obtaining request received in S174 (S177). In a case where the referrer header does not exist (S177: NO), the gateway server 2 executes the processings in S181 and subsequent operations.

In a case where the referrer header exists (S177: YES), the gateway server 2 obtains the link origin URL from the referrer header (S178). The gateway server 2 obtains the reference target URL from the HTML obtaining request (S179). Next, the gateway server 2 updates the "link destination URL" entry with regard to the non-reference list where the web page corresponding to the referrer is registered in the "page URL" entry (S180). Then, the gateway server 2 issues the HTML obtaining request on the basis of the reference target URL (S181). The issued HTML obtaining request is transmitted to the relevant web server 3. Then, the gateway server 2 receives the HTML document transmitted from the web server 3.

In a case where it is determined in S174 that the HTML obtaining request is not received (S174: NO), the gateway server 2 determines whether or not the monitoring timer in activation exists (S182). In a case where it is determined that the monitoring timer in activation exists (S182: YES), the gateway server 2 obtains the monitoring destination URL corresponding to the monitoring timer (S183). Then, the gateway server 2 issues the HTML obtaining request with regard to the obtained monitoring destination URL (S184). After that, the gateway server 2 returns the processing to S171.

In a case where it is determined in S182 that the monitoring timer in activation does not exist (S182: NO), the gateway server 2 determines whether or not the HTML document is received (S185). In a case where the HTML document is not received (S185: NO), the processing is returned to S171. In a case where it is determined that the HTML document is received (S185: YES), the gateway server 2 extracts the block structure of the article and the link destination URL in the block from the HTML document (S186). Then, the gateway server 2 updates the non-reference list (S187).

Next, the gateway server 2 determines whether or not the URL of the HTML document received in S185 is the monitoring target URL (S188). In a case where it is determined that the URL is not the monitoring target URL (S188: NO), the gateway server 2 generates the navigation information from the non-reference list (S189). Then, the gateway server 2 adds the navigation information to the HTML document (S190). The gateway server 2 transmits the HTML document to which the navigation information is added to the mobile phone device 1 serving as the client (S191).

On the other hand, in a case where the URL of the HTML document received in S185 is the monitoring target URL (S188: YES), the gateway server 2 returns the processing to S171.

As described above, the gateway server 2 monitors the link information included in the web page by periodically referring to the web page while the user does not access. Thus, with the technology according to the embodiment, it is possible to include the updated article while the user does not access the web page in the list of the non-reference pages. The efficiency for the web page reference by the user is improved.

It should be noted that according to the embodiment, the update monitoring, the management of the non-reference list, and the like are performed by the gateway server 2. However, these processings may be performed by the mobile phone device 1. Of course, these processings may also be performed inside the web browser.

As the user utilizes the mobile phone device 1 in a mobile environment, a connection to a network may be disconnected in many cases due to a deteriorated communication state or the like. In such a case, it is also effective for the gateway server 2 side to automatically perform the update monitoring. According to an embodiment, the gateway server 2 determines and performs the update monitoring.

Figure 33:
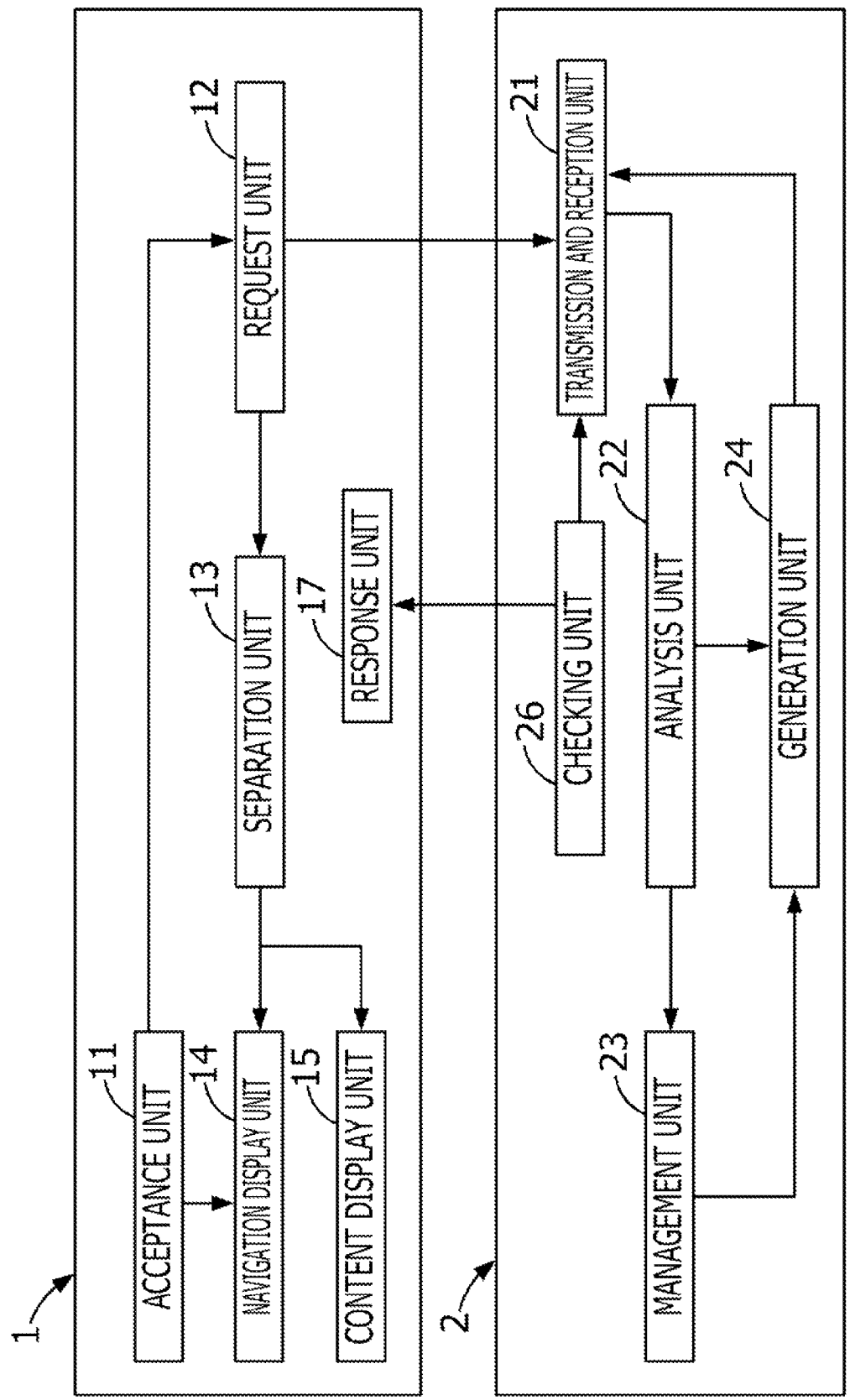
FIG. 33 is a function block diagram of the mobile phone device and the gateway server according to a embodiment.

FIG. 33 is a function block diagram of the mobile phone device 1 and the gateway server 2 according to the embodiment. The gateway server 2 is further provided with a checking unit 26 in addition to the configuration shown in FIG. 2. The checking unit 26 periodically transmits data for checking a keep-alive state of the display control. Also, the mobile phone device 1 is further provided with a response unit 17. The response unit 17 responses to a keep-alive monitoring from the gateway server 2. The checking unit 26 detects a deactivated state of the mobile phone device 1. Then, when the mobile phone device 1 is in the deactivated state, the checking unit 26 obtains the latest reference URL. Then, the checking unit 26 requests the transmission and reception unit 21 to obtain information on the URLs periodically obtained.

Herein, the deactivated state of the mobile phone device 1 indicates a state in which the web page may not be received. For example, the deactivated state is a state in which a communication with the gateway server 2 is interrupted or a state in which the web browser is not activated in the mobile phone device 1.

According to this embodiment, the keep-alive monitoring on the connection state is performed while the gateway server 2 periodically transmits a keep-alive monitoring command to the web browser. The keep-alive monitoring command is a command with a small data amount. The gateway server 2 detects a case where the data transmission keeps failing for a certain period of time or a case where no response arrives from the web browser. Then, the gateway server 2 obtains the latest URL displayed on the web browser before the deactivated state. The gateway server 2 automatically sets the URL as the update monitoring target. In a case where the obtained URL is an individual web page, the gateway server 2 sets the initial page as the monitoring target. It should be noted that the processing after the monitoring target is set is similar to the processing of selecting the menu from the web browser and issuing the update monitoring command according to the embodiment.

It should be noted that in a case where the communication is performed via a mobile network, the keep-alive monitoring may be performed.

Also, in the above-mentioned example, in order to perform the keep-alive monitoring, the gateway server 2 transmits the command to the web browser. However, the gateway server 2 monitors whether or not the command transmitted from the web browser is received in a certain period of time. Then, the gateway server 2 may start the keep-alive monitoring depending on the monitoring result.

Figure 34:
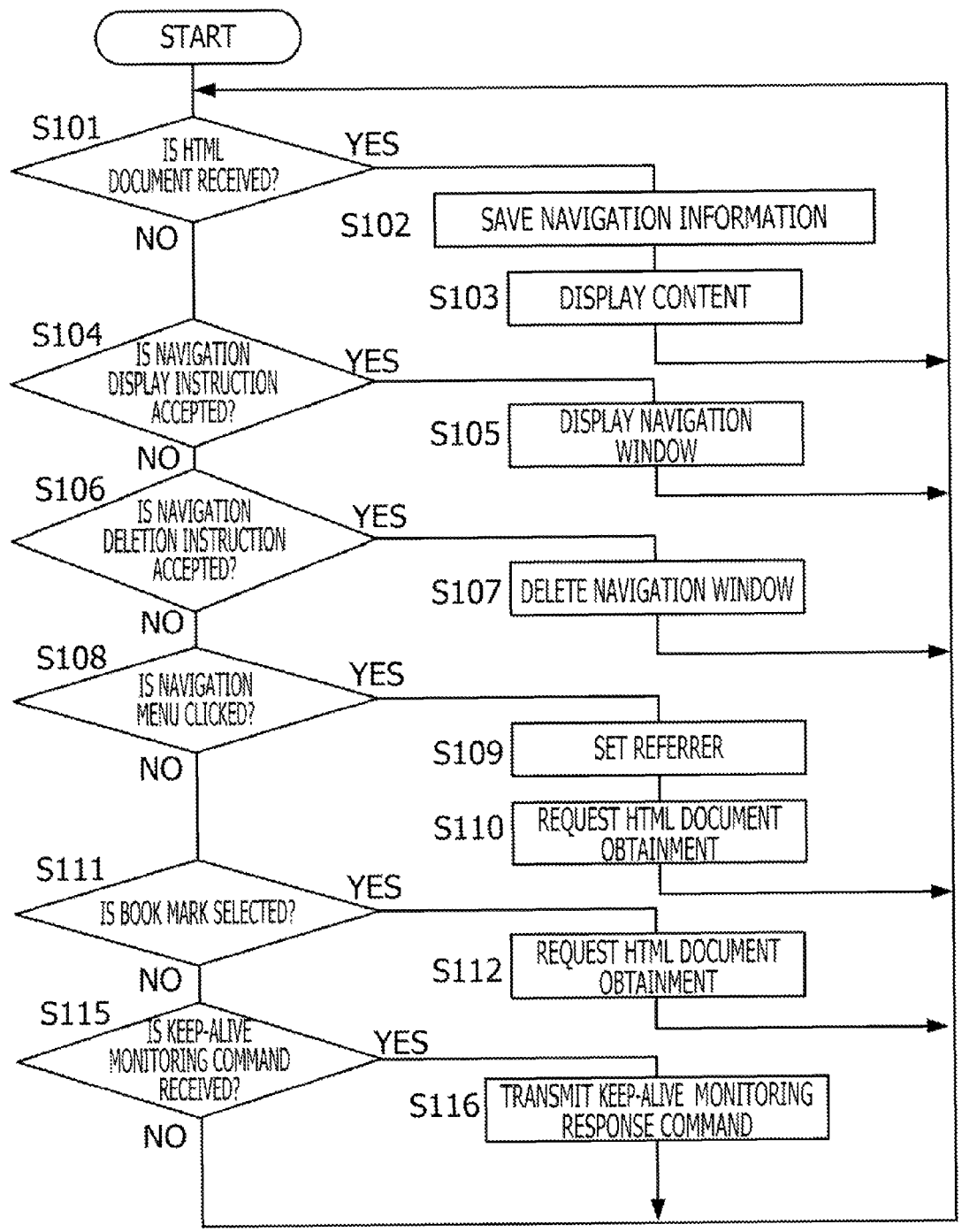
FIG. 34 is a flow chart for a processing procedure executed by the mobile phone device.

FIG. 34 is a flow chart executed by the mobile phone device 1. It should be noted that in the present flow chart, substantially the same processing as that shown in FIG. 13 is assigned with the same symbol, and a description thereof will be omitted. Similarly as in FIG. 13, the mobile phone device 1 determines whether or not the bookmark is selected (S111). In a case where it is determined that the bookmark is not selected (S111: NO), the mobile phone device 1 determines whether or not the keep-alive monitoring command transmitted from the gateway server 2 is received (S115).

In a case where the keep-alive monitoring command is not received (S115: NO), the mobile phone device 1 returns the processing to S101. In a case where the keep-alive monitoring command is received (S115: YES), the mobile phone device 1 transmits a keep-alive monitoring response command to the gateway server 2 (S116).

Figure 35:
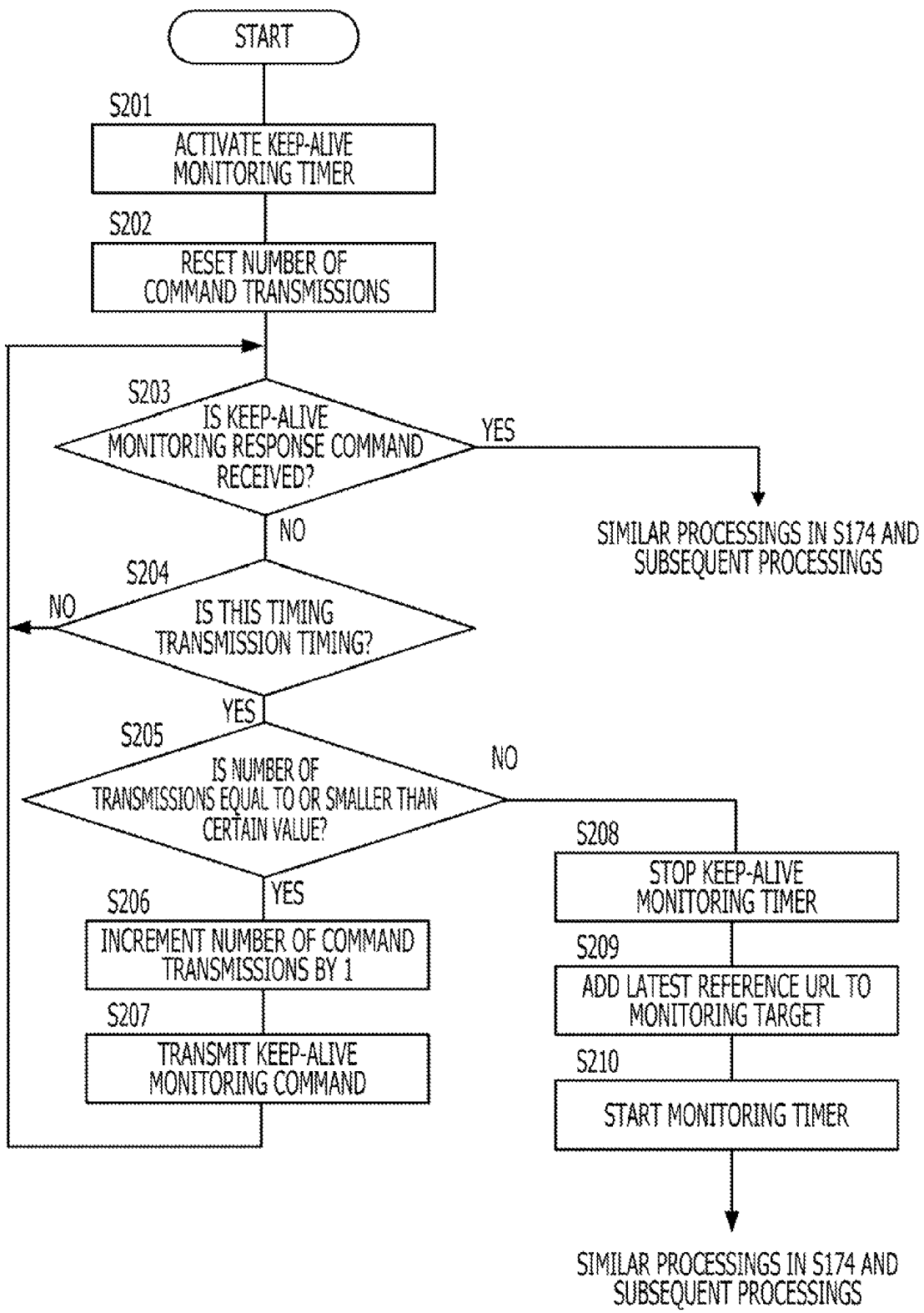
FIG. 35 is a flow chart for a processing procedure executed by the gateway server.

Next, a processing procedure executed by the gateway server 2 will be described. FIG. 35 is a flow chart executed by the gateway server 2. The gateway server 2 activates a keep-alive monitoring timer (not shown) with respect to the individual mobile phone device 1 at an appropriate timing (S201). The gateway server 2 resets the number of transmissions of the keep-alive monitoring command (S202).

Next, the gateway server 2 determines whether or not the keep-alive monitoring response command is received from the mobile phone device 1 which activates the keep-alive monitoring timer (S203). In a case where the alive monitoring response command is received (S203: YES), the gateway server 2 executes the processings in S174 and subsequent operations of the flow chart shown in FIG. 32.

In a case where the keep-alive monitoring response command is not received (S203: NO), the gateway server 2 determines whether or not this is a transmission timing for the keep-alive monitoring command by referring to the keep-alive monitoring timer (S204). In a case where this is not the transmission timing (S204: NO), the gateway server 2 returns the processing to S203. In a case where this is the transmission timing (S204: YES), the gateway server 2 determines whether or not the number of transmission of the keep-alive monitoring command is equal to or smaller than a certain value (S205).

In a case where the number of transmission is equal to or smaller than the certain value (S205: YES), the gateway server 2 increments the number of transmission of the keep-alive monitoring command by 1 (S206). Then, the gateway server 2 transmits the keep-alive monitoring command to the mobile phone device 1 (S207). After the transmission of the keep-alive monitoring command, the gateway server 2 returns the processing to S203.

In a case where the number of transmission is larger than the certain value (S205: NO), the gateway server 2 stops the keep-alive monitoring timer with respect to the mobile phone device 1 which activates the keep-alive monitoring timer (S208). Then, the gateway server 2 adds the latest reference URL of the relevant mobile phone device 1 to the monitoring target (S209). Then, the gateway server 2 activates the monitoring timer with respect to the URL added to the monitoring target (S210). The gateway server 2 executes the processings in S174 and subsequent processing of FIG. 32.

As described above, on the basis of the determination by the gateway server 2, it is possible to monitor the link information of the web page. In other words, in a case where it is determined that the user may not continue the page reference, the web page is periodically monitored. Without issuing an explicit instruction by the user, it is possible to include the updated article while the user does not access the web page in the list of the non-reference pages. The operability and usability for the user and also the efficiency for the web page reference are improved.

In a case where the user selects the navigation window, the navigation window may display an outline of content. With this configuration, it is possible for the user to find out the outline of the content of the web page at the link destination in advance. It is therefore possible for the user to move to a web page of interest.

It should be noted that the configurations of the mobile phone device 1 and the gateway server 2 according to an embodiment are similar to those of the embodiment. Also, the analysis unit 22 extracts the received link destination information in the web page and the outline of the content corresponding to the link information to notify the management unit 23. The management unit 23 also holds the outline of the content corresponding to the non-reference page. Then, the generation unit 24 includes the link destination information and also the outline of the content in the navigation information.

When the gateway server 2 analyzes the content of the HTML document, the gateway server 2 also obtains the article block name, the article name, and the content of the article other than the link destination URL. Then, the gateway server 2 saves the obtained content in the non-reference list. The content of the article may be a content from <div> to </div> determined as the article. Also, the content of the article may be a fixed number of characters at the beginning. Also, in the case of the web page which is not constructed, the gateway server 2 obtains the HTML document from the web server at the link destination. Then, the gateway server 2 may display the content of the <title> tag.

As described above, the gateway server 2 may include the content of the article at the time of the navigation information generation. Thus, the web browser may display the content of the article when a focus is on the navigation window. FIG. 36 shows an example of the navigation information including the article content. FIG. 37 shows a navigation window example including the article content. In FIG. 37, in a case where the user focuses on an item of the navigation window, the web browser displays the content of the article corresponding to the item in a pop-up window.

As described above, according to the embodiment, the gateway server 2 manages the non-reference page and the outline of the content of the web page while being associated with each other. The web browser may display the outline of the web page together with the navigation window. As the user may obtain reference information at the time of the page move, the operability and usability for the user and also the efficiency for the web page reference are improved.

It should be noted that according to the embodiment, the HTML analysis, the non-reference list management, and the like are performed by the gateway server 2. However, these processings may be performed by the mobile phone device 1. Of course, the web browser may also perform these processings.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

The invention claimed is:
1. A server apparatus comprising:
a transceiver which
transmits to a communication apparatus a web page having link information to each of a plurality of contents, transmits to the communication apparatus a content requested by the communication apparatus among the plurality of contents, and transmits to the communication apparatus navigation information that includes link information to any of the plurality of contents;

a storage device which stores identification information for identifying each of the plurality of contents and reference information indicating whether each content corresponding to the identification information has been transmitted to the communication apparatus while each content and the corresponding identification information are being associated with each other; and a processor which executes, based on a program, a procedure including:

a generation process that refers to the storage device and generates, on the basis of the reference information, the navigation information which does not include the link information corresponding to the content which has been transmitted to the communication apparatus.

2. The server apparatus according to claim 1, wherein the procedure further includes:

a management process that refers to the storage device and sets the reference information for one of the plurality of contents to indicate that the one content is transmitted to the communication apparatus even when the one content is not requested by the communication apparatus.

3. The server apparatus according to claim 2, wherein the storage device further stores categories to which each of the plurality of contents belongs while each content and the category to which it belongs are being associated with each other, and wherein the management process refers to the storage device in a case where it is detected that a first content belonging to a first one of the categories is transmitted to the communication apparatus and a second content belonging to a second category which is different from the first category is subsequently transmitted to the communication apparatus, and updates the reference information on each of the plurality contents that are associated with the first category to indicate that each content associated with the first category is transmitted to the communication apparatus.

4. The server apparatus according to claim 3, wherein the management process refers to the storage device in a case where a certain period of time elapses after it is detected that the first content belonging to the first category is transmitted to the communication apparatus and the second content belonging to the second category is subsequently transmitted to the communication apparatus, and updates the reference information corresponding to each of the plurality of content that are associated with the first category to indicate that each content associated with the first category is transmitted to the communication apparatus.

5. The server apparatus according to claim 3, wherein the management process refers to the storage device in a case where the transceiver outputs the web page to the communication apparatus at least a certain number of times after it is detected that the first content belonging to the first category is transmitted to the communication apparatus and the second content belonging to the second category is transmitted to the communication apparatus, and updates the reference information corresponding to each of the plurality of contents associated with the first category to indicate that each content associated with the first category is transmitted to the communication apparatus.

6. The server apparatus according to claim 2, wherein the storage device stores first domain information on the web page including the plurality of contents as the link information while being associated with the identification information and the reference information, and wherein the management process refers to the storage device in a case where it is detected that a first content associated with the first domain information is transmitted to the communication apparatus and a second content associated with a second domain information which is different from the first domain information is subsequently transmitted to the communication apparatus, and updates the reference information corresponding to each of the plurality of contents associated with the first domain information to indicate that each content associated with the first domain information is transmitted to the communication apparatus.

7. The server apparatus according to claim 6, wherein the management process refers to the storage device in a case where a certain period of time elapses after it is detected that the first content corresponding to the first domain information is transmitted to the communication apparatus and the second content corresponding to the second domain information is subsequently transmitted to the communication apparatus, and updates the reference information corresponding to each of the plurality of contents associated with the first domain information to indicate that all contents associated with the first domain is transmitted to the communication apparatus.

8. The server apparatus according to claim 6, wherein the management process refers to the storage device in a case where the transceiver outputs the web page to the communication apparatus at least a certain number of times after it is detected that the first content corresponding to the first domain information is transmitted to the communication apparatus and the second content corresponding to the second domain information is transmitted to the communication apparatus, and updates the reference information corresponding to each of the plurality of contents associated with the first domain information to indicate that each content associated with the first domain information is transmitted to the communication apparatus.

9. The server apparatus according to claim 1, wherein the procedure further includes:

a monitoring process that monitors a change of the plurality of contents; and a management process that updates the information stored by the storage device on the basis of a result of the monitoring.

10. The server apparatus according to claim 9, wherein the procedure further includes:

a checking process that performs a communication with the communication apparatus at a certain time interval and to determine, in a case where the communication is not able to be performed with the communication apparatus for at least a certain period of time, that the communication state is incommunicable, wherein the monitoring process starts the monitoring in a case where the checking process determines that the communication state is incommunicable.

11. The server apparatus according to claim 9, wherein the procedure further includes:

an analysis process to extract each of the plurality of contents and to store the identification information corresponding to each of the extracted plurality of contents in the storage device, to extract link information newly added to the web page in a case where the monitoring process detects the change, wherein the management process adds information on a content corresponding to the link information extracted by the analysis process in the storage device.

12. The server apparatus according to claim 11, wherein the generation process generates the navigation information to include the content information added by the management process.

13. A communication apparatus comprising:
a storage device; and
a processor that executes a procedure including:
a request process that
receives a web page having link information to each of a plurality of contents from a remote apparatus,
requests any of the plurality of contents from the remote apparatus on the basis of an input from a user, and
receives the requested content from the remote apparatus;
a storage process that stores, in the storage device, identification information for identifying each of the plurality of contents and reference information indicating whether the content corresponding to the identification information is received from the server apparatus while the content and the identification information are being associated with each other; and
a generation process that refers to the storage device and generates, on the basis of the reference information, navigation information which includes link information to any of the plurality of contents other than link information corresponding to the content received from the server apparatus.

14. The communication apparatus according to claim 13, wherein the procedure further includes:
an acceptance process that accepts a selection of any piece of the link information among the link information included in the displayed navigation information; and
a navigation display process that displays the generated navigation information,
wherein the request process requests the server apparatus to transmit the content corresponding to the accepted selection from the link information.

15. The communication apparatus according to claim 13, wherein the procedure further includes:
a management process that refers to the storage device and sets the reference information for one of the plurality of contents to indicate that the one content is received even when the one content is not received.

16. The communication apparatus according to claim 13, wherein the procedure further includes:
a monitoring process that monitors a change of the plurality of contents; and a management a management process that updates the information stored by the storage device on the basis of a result of the monitoring.

17. A navigation generation method executed by a computer, the method comprising:
transmitting to a communication apparatus a web page having link information to each of a plurality of contents;
transmitting to the communication apparatus a content requested by a communication apparatus among the plurality of contents;
storing identification information for identifying each of the plurality of contents and reference information indicating whether each content corresponding to the stored identification information has been transmitted to the communication apparatus while each content and the correspondingly stored identification information are being associated with each other;
generating, on the basis of the stored reference information corresponding to each of the plurality of contents, navigation information which includes link information to any of the plurality of contents other than link information corresponding to the content requested by the communication apparatus; and
transmitting the navigation information to the communication apparatus.

18. The navigation generation method according to claim 17, further comprising:
setting the stored reference information for one of the plurality of contents to indicate that the one content is transmitted to the communication apparatus even when the one content is not requested by the communication apparatus.

19. The navigation generation method according to claim 17, further comprising:
monitoring a change of the plurality of contents; and
updating the stored identification or reference information on the basis of a result of the monitoring.

20. The navigation generation method according to claim 17, further comprising:
extracting each of the plurality of contents included in the web page;
extracting, in a case where the change is detected in the monitoring, link information newly added to the web page; and
adding to the stored identification or reference information on a content corresponding to the extracted link information.

* * * * *